US010856160B1

(12) United States Patent
Gupta et al.

(10) Patent No.: US 10,856,160 B1
(45) Date of Patent: Dec. 1, 2020

(54) PERFORMING ROUND TRIP TIME RANGING USING FEWER THAN ALL ADDRESSES OF A WIRELESS DEVICE

(71) Applicant: Motorola Mobility LLC, Chicago, IL (US)

(72) Inventors: Ranjeet Gupta, Bengaluru (IN); Prashanth Chakravarthy, Bangalore (IN); Mary Khun Hor-Lao, Chicago, IL (US); Binesh Balasingh, Naperville, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/446,217

(22) Filed: Jun. 19, 2019

(51) Int. Cl.
| | |
|---|---|
| *H04L 12/28* | (2006.01) |
| *H04W 24/08* | (2009.01) |
| *H04W 4/029* | (2018.01) |
| *H04L 12/26* | (2006.01) |
| *H04J 1/16* | (2006.01) |

(52) U.S. Cl.
CPC ......... *H04W 24/08* (2013.01); *H04L 43/0864* (2013.01); *H04W 4/029* (2018.02)

(58) Field of Classification Search
CPC ............... H04W 56/0055; H04L 43/0864
USPC .......................... 370/252, 278, 329, 386
See application file for complete search history.

(56) References Cited

U.S. PATENT DOCUMENTS

| | | |
|---|---|---|
| 10,568,046 B1 | 2/2020 | Gupta et al. |
| 2013/0006435 A1 | 1/2013 | Berrios et al. |
| 2013/0107824 A1 | 5/2013 | Cherian et al. |
| 2014/0198637 A1 | 7/2014 | Shan et al. |
| 2015/0016298 A1 | 1/2015 | Ganichev et al. |
| 2015/0351084 A1 | 12/2015 | Werb |
| 2016/0337185 A1* | 11/2016 | Hardison ............ H04L 61/2514 |
| 2017/0048788 A1 | 2/2017 | Chen et al. |
| 2017/0346762 A1* | 11/2017 | Lapidous ............... H04L 47/827 |
| 2018/0359165 A1* | 12/2018 | Frydman ................ G01S 13/765 |
| 2019/0141631 A1* | 5/2019 | Patil ................... H04W 52/0216 |
| 2020/0008095 A1* | 1/2020 | Patil ...................... H04W 76/15 |
| 2020/0045647 A1 | 2/2020 | Gupta et al. |

OTHER PUBLICATIONS

"Non-Final Office Action", U.S. Appl. No. 16/052,465, dated Sep. 13, 2019, 7 pages.

(Continued)

*Primary Examiner* — John Pezzlo
(74) *Attorney, Agent, or Firm* — SBMC

(57) ABSTRACT

A computing device initiates wireless RTT ranging communication with a wireless device by specifying a source address (e.g., a MAC address or BSSID) of the wireless device in frames sent to the wireless device. The computing device determines situations in which a wireless device is using multiple source addresses. If a wireless device is using multiple source addresses, the computing device performs wireless RTT ranging with the wireless device using less than all (e.g., a single one) of the multiple source addresses. The computing device performs wireless RTT ranging with less than all of the source addresses used by the wireless device because the distance between the computing device and the wireless device is the same regardless of which of the multiple source addresses the wireless device is using.

20 Claims, 10 Drawing Sheets

(56) References Cited

OTHER PUBLICATIONS

"Corrected Notice of Allowability", U.S. Appl. No. 16/052,465, dated Jan. 15, 2020, 3 pages.
"Notice of Allowance", U.S. Appl. No. 16/052,465, dated Dec. 26, 2019, 7 pages.
"Restriction Requirement", U.S. Appl. No. 16/052,465, dated Jun. 21, 2019, 6 pages.
"What is the difference between SSID and BSSID?", Retrieved at: https://community.arubanetworks.com/t5/Wireless-Access/what-is-the-difference-between-SSID-and-BSSID/td-p/156842—on Oct. 24, 2018, 8 pages.
Aldan, "Marauder's Map: Sniffing MAC addresses in the MIT wireless network", May 12, 2016, 14 pages.
Beaver, "Power-Aware In-Network Query Processing for Sensor Data", Jan. 2003, 17 pages.
Chandra, "MultiNet: Connecting to Multiple IEEE 802.11 Networks Using a Single Wireless Card", In Proceedings: IEEE INFOCOM, The 23rd Annual Joint Conference of the IEEE Computer and Communications Societies, Mar. 7, 2004, 12 Pages.
Cunche, "I know your MAC Address: Targeted tracking of individual using Wi-Fi", Oct. 3, 2013, 18 pages.
Hanschke, "Challenges of WiFi-Enabled and Solar-Powered Sensors for Smart Ports", Nov. 2016, 6 pages.
Korakis, "Link Quality based Association Mechanism in IEEE 802.11h compliant Wireless LANs", Jan. 2005, 6 pages.
Mondal, "Power Efficient Router Architecture for Wireless Network-on-Chip", Mar. 2016, 7 pages.
Niesen, "Inter-Vehicle Range Estimation from Periodic Broadcasts", Jul. 7, 2016, 16 pages.
Nychis, "Using Your Smartphone to Detect and Map Heterogeneous Networks and Devices in the Home", Proceedings of the 1st ACM workshop on Hot topics in wireless, Sep. 11, 2014, pp. 31-35.
P, "Why does the AP have multiple MAC addresses?", Retrieved at: https://help.cloudtrax.com/hc/en-us/articles/206546684-Why-does-the-AP-have-multiple-MAC-addresses-, Feb. 28, 2017, 2 pages.
Panic, "Architecture of a Power-Gated Wireless Sensor Node", Sep. 2008, pp. 844-849.
Pering, "Exploiting Radio Hierarchies for Power-Efficient Wireless Device Discovery and Connection Setup", VLSID '05, Jan. 3-7, 2005, Jan. 3, 2005, 6 pages.
Rozner, "NAPman: Network-Assisted Power Management for WiFi Devices", Jun. 15, 2010, 15 pages.
Vanhoef, "Why MAC Address Randomization is not Enough: An Analysis of Wi-Fi Network Discovery Mechanisms", May 30, 2016, 12 pages.

\* cited by examiner

PERFORMING ROUND TRIP TIME RANGING USING FEWER THAN ALL ADDRESSES OF A WIRELESS DEVICE

BACKGROUND

As computing technology has advanced, computing devices have become increasingly commonplace in our lives. For example, many people have computing devices such as smartphones or smartwatches that they carry with them or wear throughout the day. Given the close proximity of such computing devices to the users throughout the day, some applications desire to provide location-based services to the users. For example, a mapping application may desire to provide direction or navigation services to users.

In order for applications to provide location-based services the computing device determines the location of the computing device. One technique for determining the location of a computing device is referred to as wireless round trip time (RTT) ranging. Using wireless RTT ranging the computing device communicates with one or more wireless access points. Given the amount of time it takes for frames of data to be communicated from a wireless access point to the computing device, the computing device can determine the distance between the access point and the computing device. Given the distances between the computing device and three or more wireless access points, the computing device can determine its location relative to the three or more wireless access points.

While supporting such location-based services provides useful functionality to the user of the computing device, it is not without its problems. One such problem is that communicating with an access point to perform wireless RTT ranging consumes energy at the computing device. Computing devices that perform wireless RTT ranging are oftentimes battery-powered portable devices and performing wireless RTT ranging repeatedly can consume a significant amount of energy at the computing device, which reduces the amount of energy available for the computing device to perform other functions. This energy drain can lead to user frustration and dissatisfaction with their computing devices.

BRIEF DESCRIPTION OF THE DRAWINGS

Implementations of performing round trip time ranging using fewer than all addresses of a wireless device are described with reference to the following Figures. The same numbers may be used throughout to reference like features and components shown in the Figures.

DETAILED DESCRIPTION

Figure 1:
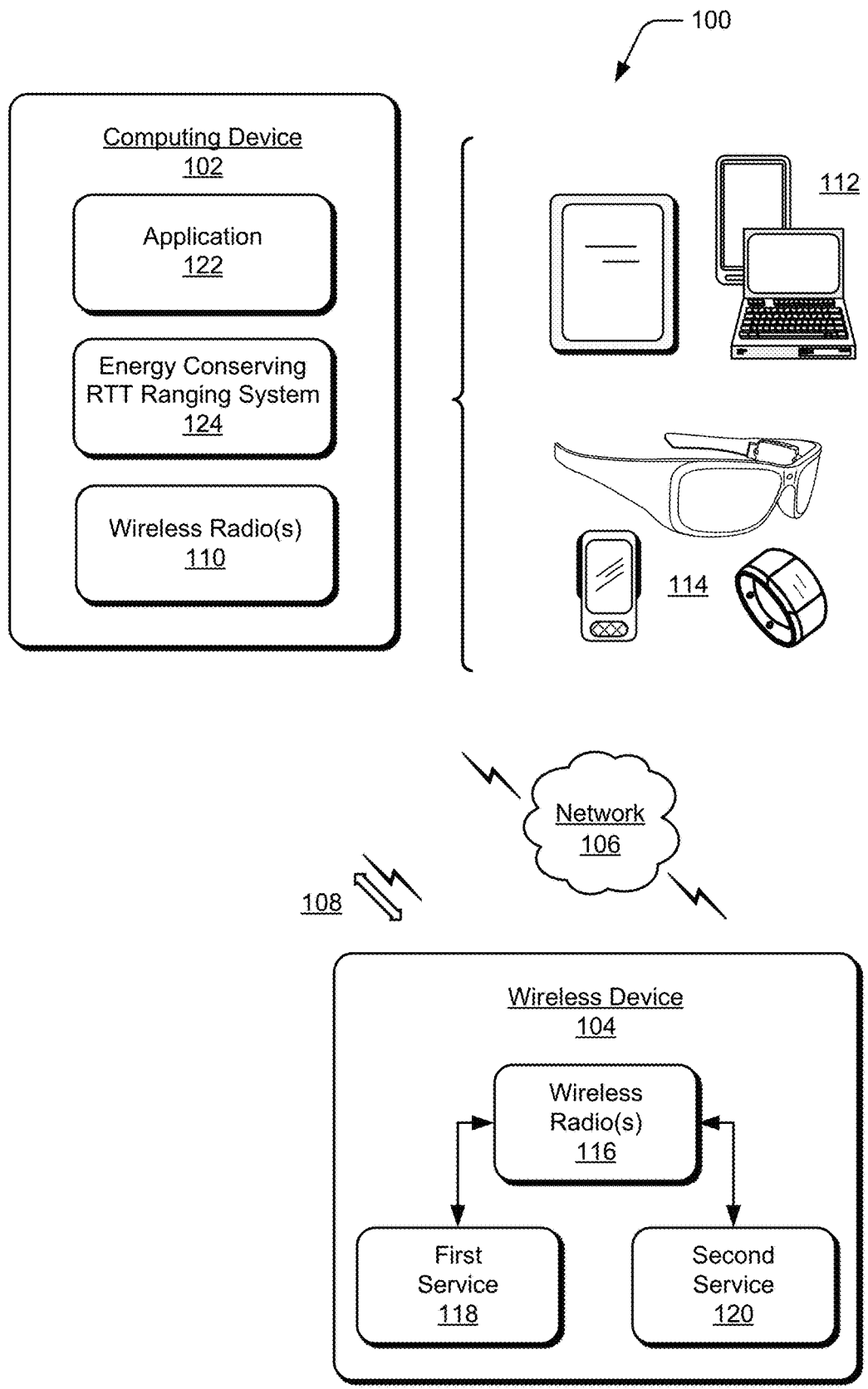
FIG. 1 illustrates an example system that can be used to implement techniques of performing round trip time ranging using fewer than all addresses of a wireless device as described herein.

Performing round trip time ranging using fewer than all addresses of a wireless device is discussed herein. A computing device performs wireless round trip time (RTT) ranging over a wireless network. Using wireless RTT ranging the computing device communicates with one or more wireless devices, sending to and receiving from each wireless device various frames of data without needing to connect to the wireless device. These frames of data are collectively referred to as an RTT burst. Given the amount of time it takes for frames of data to be communicated from a wireless device to the computing device, and the propagation speed of signals over the wireless network, the computing device determines the distance between the wireless device and the computing device. Given the distances between the computing device and three or more wireless devices, the computing device determines its location relative to the three or more wireless devices.

In one or more implementations, the computing device initiates wireless RTT ranging communication with a wireless device by specifying a source address (e.g., a media access control (MAC) address, a basic service set identifier (BSSID)) of the wireless device in frames sent to the wireless device. The wireless device responds with one or more timing frames (e.g., fine timing measurement (FTM) frames), which the computing device uses to determine the distance between the computing device and the wireless device. The computing device then repeats this communication with additional wireless devices and uses the distances to determine the location of the computing device relative to the wireless devices.

In some situations, a wireless device uses multiple source addresses. This can be for a variety of reasons, such as the wireless device supporting two different frequency bands for wireless communication (e.g., 2.4 gigahertz (GHz) and 5 GHz) and using a different source address for each band, the wireless device supporting multiple different services (e.g., a smart thermostat device that provides services for thermostat control, as well as a voice operated service) and using a different source address for each service, and so forth.

In one or more implementations, the computing device determines situations in which a wireless device is using multiple source addresses. This determination can be made in various different manners, such as by analyzing a fast initial link setup (FILS) beacon to identify different BSSIDs used by a wireless device, by analyzing organizationally unique identifiers (OUIs) included in management frames communicated by a wireless device, by analyzing RSSI values of signals received from a wireless device, by analyzing transmit power control (TPC) reports signals received from a wireless device, and so forth. If a wireless device is using multiple source addresses, the computing device performs wireless RTT ranging with the wireless device using fewer than all (e.g., a single one) of the multiple source addresses. The computing device need not perform wireless RTT ranging with the other source addresses used by the wireless device. The computing device performs wireless RTT ranging with fewer than all of the source addresses used by the wireless device because the distance between the computing device and the wireless device is the same regardless of which of the multiple source addresses is used for wireless RTT ranging.

Performing wireless RTT ranging with fewer than all of the source addresses used by the same wireless device reduces the number of communications the computing device has with the wireless device when performing wireless RTT ranging, which conserves energy at the computing device as well as the wireless device. For example, in some situations the computing device expends approximately 0.7523 milliamp hours (mAh) for each RTT burst. Thus, if a single wireless device is using two source addresses, by performing RTT ranging with only one of the two source addresses approximately 0.7523 mAh can be saved each time RTT ranging is performed with the wireless device. This energy savings can be particularly beneficial when performing indoor navigation due to the need to update the location of the computing device in real time, resulting in frequent RTT bursts. For example, the computing device may use 6 RTT bursts per minute, which can result in expending approximately 270 mAh per hour, which is approximately 9% of the energy in a 3000 mAh battery. For each RTT burst per minute that need not be performed, the computing device may save approximately 45 mAh per hour.

While features and concepts of performing round trip time ranging using fewer than all addresses of a wireless device can be implemented in any number of different devices, systems, networks, environments, and/or configurations, implementations of performing round trip time ranging using fewer than all addresses of a wireless device are described in the context of the following example devices, systems, and methods.

FIG. 1 illustrates an example system 100 that can be used to implement techniques of performing round trip time ranging using fewer than all addresses of a wireless device as described herein. In this example, the system 100 includes a computing device 102 and a wireless device 104 that can communicate with each other via a network 106 (e.g., a wireless local area network (WLAN)). The computing device 102 may be any type of electronic, computing, and/or wireless devices, such as a mobile phone, smartwatch, or tablet device, that includes one or more wireless radios 110. Examples of electronic and/or computing devices 112 depicted in FIG. 1 include a mobile phone, laptop, or tablet device. The electronic and/or computing devices described herein may also be configured as a wearable device 114 that is designed to be worn by, attached to, carried by, or otherwise transported by a user. Examples of the wearable devices 114 depicted in FIG. 1 include glasses, a smart band or smartwatch, and media playback device, such as clip-on fitness device, media player, or tracker. Other examples of wearable devices 114 include, but are not limited to, badges, a key fob, an access card, a ring, an article of clothing, a glove, or a bracelet, to name a few examples.

The wireless device 104 may be any type of electronic and/or computing device that includes one or more wireless radios 116. For example, the wireless device may be a wireless access point that includes one or more wireless radios 116 and that allows other wireless devices to connect to a wired network. The wireless device 104 can be implemented to provide various services, such as a first service 118 and a second service 120 that can be published to the computing device 102 and other devices that are communicatively accessible via the network 106. The services 118, 120 can be published by transmitting data messages that include management frames (e.g., identifying the source addresses used by the services 118, 120) via the one or more wireless radios 116 of the wireless device 104 using the network 106. The management frames can be any type of data frame that announces services or information regarding the wireless device 104. Generally, the computing device 102 and the wireless device 104 are electronic and/or computing devices implemented with various components, such as a processing system and memory, as well as any number and combination of different components as further described with reference to the example device shown in FIG. 10.

The wireless device 104 may use different source addresses for each of the multiple services 118, 120. For example, the wireless device 104 may be a dual-band wireless access point that provides wireless connectivity services on 2.4 GHz and 5.0 GHz frequency bands via 2.4 GHz and 5.0 GHz radios. The dual-band access point includes two different radios using a common communication protocol. The management frames transmitted at 2.4 GHz include a source address associated with the 2.4 GHz radio of the dual-band access point, and the management frames transmitted at 5.0 GHz include a different source address associated with the 5.0 GHz radio of the dual-band access point. By way of another example, the wireless device 104 may transmit management frames associated with different source addresses for other reasons, such as to publish multiple different services using a single wireless radio 116.

In one or more implementations, the wireless device 104 is a wireless access point. The wireless access point transmits management frames associated with different source addresses, such as transmitting management frames with different BSSIDs (one BSSID corresponding to each different source address).

Although a single wireless device 104 is illustrated in FIG. 1, it should be noted that the system 100 can include multiple wireless devices. These multiple wireless devices can include wireless devices analogous to the wireless device 104 (e.g., supporting multiple services). Additionally or alternatively, these multiple wireless devices can include wireless devices that include a single service (e.g., and use a single BSSID).

As shown in FIG. 1, the computing device 102 includes the one or more wireless radios 110 that allow wireless communication with the one or more wireless radios 116 of the wireless device 104. The computing device 102 also includes an application 122 and an energy conserving RTT ranging system 124. The application 122 may be any of a variety of different applications that provide location-based services. For example, the application can be a mapping or navigational application that illustrates the location of the computing device 102 within a structure (e.g., office building, mall, etc.). By way of another example, the application can be an application supporting fine-grained location-based services, such as disambiguated voice control. E.g., this allows the user to input potentially ambiguous commands (e.g., a voice command such as "turn on this light") and have the computing device 102 perform the desired function (e.g., based on the location of the computing device 102 and known locations of light fixtures or bulbs, turn on the light fixture or bulb that is nearest to the computing device 102).

The energy conserving RTT ranging system 124 performs wireless RTT ranging to determine a distance between the computing device 102 and the wireless device 104. The energy conserving RTT ranging system 124 determines the distance to the wireless device 104 and provides an indication of the distance to the application 122. Additionally or alternatively, the energy conserving RTT ranging system 124 obtains and provides to the application 122 RTT measurements for the application 122 to determine the distance between the computing device 102 and the wireless device 104.

Generally, during operation the application 122 determines the wireless devices within the wireless communication range of the computing device 102. The application 122 can identify these wireless devices, or another application or program (e.g., an operating system program) identifies these wireless devices. The application 122 generates a source address list, which refers to a list of source addresses that are to be RTT ranged with. In one or more implementations, these source addresses are the corresponding BSSIDs of the wireless devices, in which case the source address list can be referred to as a BSSID list. The application 122 can generate the source address list using any of a variety of rules or criteria. For example, the application 122 can generate the source address list to include all of the wireless devices within the wireless communication range of the computing device 102. By way of another example, the application 122 can generate the source address list to include three wireless devices that are within wireless communication range of the computing device 102 (e.g., choosing randomly, choosing the wireless devices having the strongest received signal strength indicators (RSSIs)).

The application 122 provides the source address list to the energy conserving RTT ranging system 124, which in turn collects the RTT measurements. The RTT measurements are used (e.g., by the application 122 or the energy conserving RTT ranging system 124) to determine the distances to the various wireless devices using the source addresses on the source address list. The application 122 then proceeds to use these distances to determine the location of the computing device 102 relative to the various wireless devices using the source addresses on the source address list. The location of the computing device 102 relative to the various wireless devices can be determined using any of a variety of public and/or proprietary techniques, such as using any of a variety of multilateration techniques. Additionally or alternatively, the location of the computing device can be determined by other systems or modules, such as the energy conserving RTT ranging system 124.

The energy conserving RTT ranging system 124 can implement wireless RTT ranging using any of a variety of public and/or proprietary techniques. In one or more implementations, the energy conserving RTT ranging system 124 implements 2-sided RTT ranging based on the IEEE 802.11mc standard. In 2-sided RTT ranging the computing device 102 initiates the wireless RTT ranging by sending a wireless RTT ranging request to the wireless device 104, and in response the wireless device 104 returns one or more FTM frames that include data (e.g., a timestamp) allowing the computing device 102 to determine when the one or more FTM frames were transmitted by the wireless device 104. This 2-sided RTT ranging is discussed in more detail below.

Additionally or alternatively, other types of wireless RTT ranging can be used. E.g., 1-sided RTT ranging can be used in which the computing device 102 initiates the wireless RTT ranging by sending a wireless RTT ranging request and the wireless device 104 returns a single acknowledgment message that the computing device 102 uses to determine the distance to the wireless device 104.

It should be noted that the computing device 102 need not connect to the wireless device 104 when performing wireless RTT ranging. Rather, the wireless device 104 supports responding to wireless RTT ranging requests without requiring the device sending the wireless RTT ranging request to connect to the wireless device 104. The computing device 102 need not perform any steps traditionally associated with connected to a wireless device (e.g., in accordance with the IEEE 802.11 standard), such as providing a password or security key to the wireless device, establishing security settings, establishing bit rates, and so forth.

Figure 2:
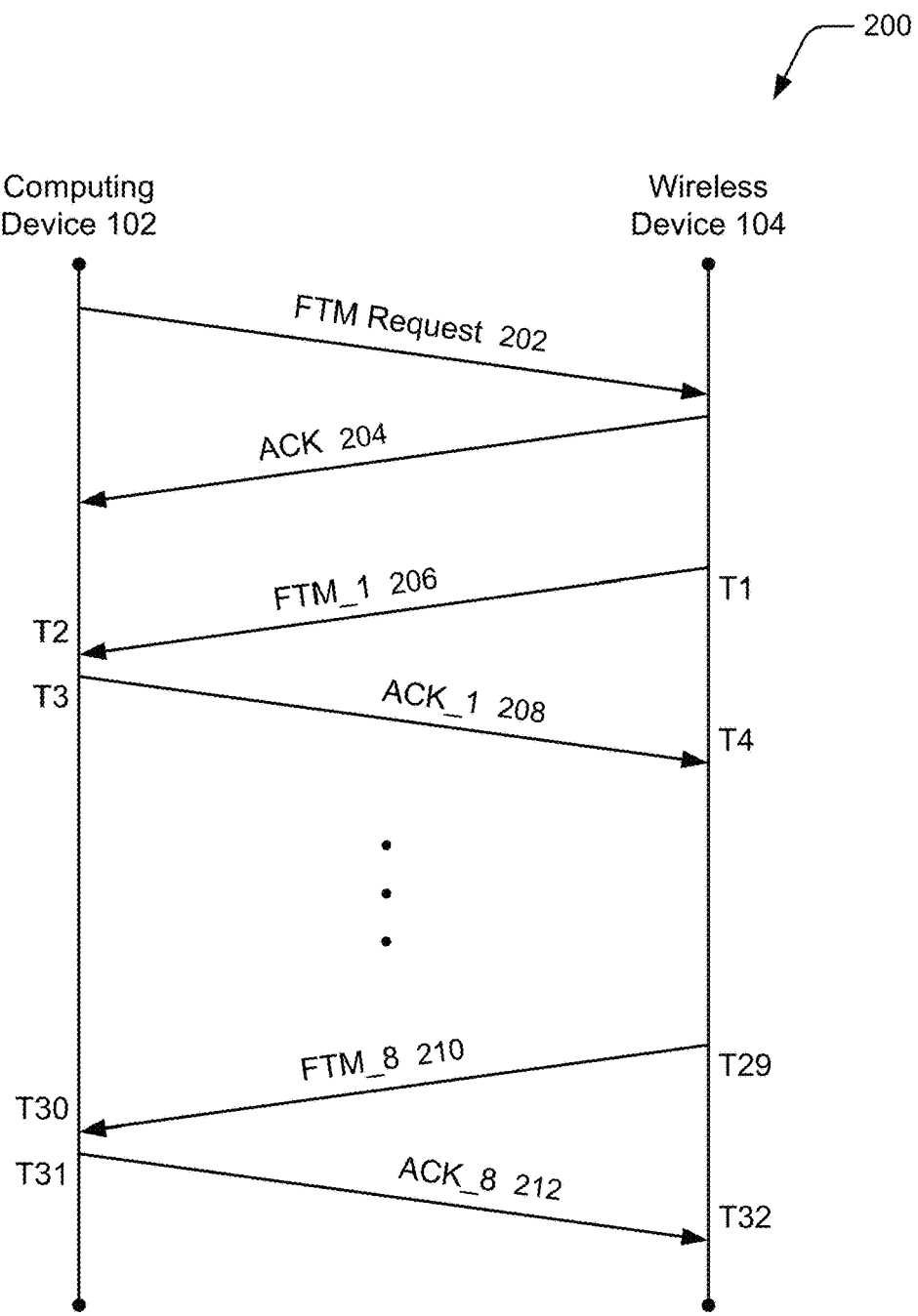
FIG. 2 illustrates an example of 2-sided RTT ranging in accordance with one or more embodiments.

FIG. 2 illustrates an example 200 of 2-sided RTT ranging in accordance with one or more embodiments. In the example 200, the computing device 102 initiates the 2-sided RTT ranging by sending a wireless RTT ranging request, illustrated as FTM request 202. In one or more implementations, the FTM request 202 is a request for the wireless device 104 to send a set of one or more FTM frames. The frames communicated between the computing device 102 and the wireless device 104 are collectively referred to as an RTT burst. Example 200 is discussed as including one RTT burst including FTM frames, although various numbers of RTT bursts can be requested (e.g., ranging from 1 to $2^{31}$) and each RTT burst can include various numbers of FTM frames (e.g., ranging from 1 to 31).

The wireless device 104 receives the FTM request 202 and returns an acknowledgment (ACK) 204 indicating that the FTM request 202 has been received. The wireless device 104 then sends a first FTM frame, illustrated as FTM_1 206. Each FTM frame includes a timestamp indicating the time that the FTM frame was sent (or created), illustrated as T1 for the frame FTM_1 206. The computing device 102 receives the frame FTM_1 206 at time T2, and at time T3 sends an acknowledgement illustrated as ACK_1 208. The wireless device 104 receives the acknowledgement ACK_1 208 at time T4. This process continues for eight FTM frames. The eighth FTM frame is illustrated as frame FTM_8 210, sent by the wireless device 104 at time T29 and received by the computing device 102 at time T30. The computing device 102 responds to the frame FTM_8 210 with an acknowledgement ACK_8 212. The acknowledgement ACK_8 212 serves as the end of the wireless RTT ranging communication between the computing device 102 and the wireless device 104.

The computing device 102 collects RTT measurements, which are the time differences between the time that each FTM frame was sent by the wireless device 104 (as indicated in the timestamp in the FTM frame) and the time the FTM frame is received by the computing device 102. For example, for frame FTM_1 206, the time difference is T2−T1. The time differences for the multiple FTM frames can be combined in various manners, such as averaged. These RTT measurements can be used (e.g., by the application 122 or the energy conserving RTT ranging system 124) to determine the distance between the computing device 102 and the wireless device 104.

Figure 3:
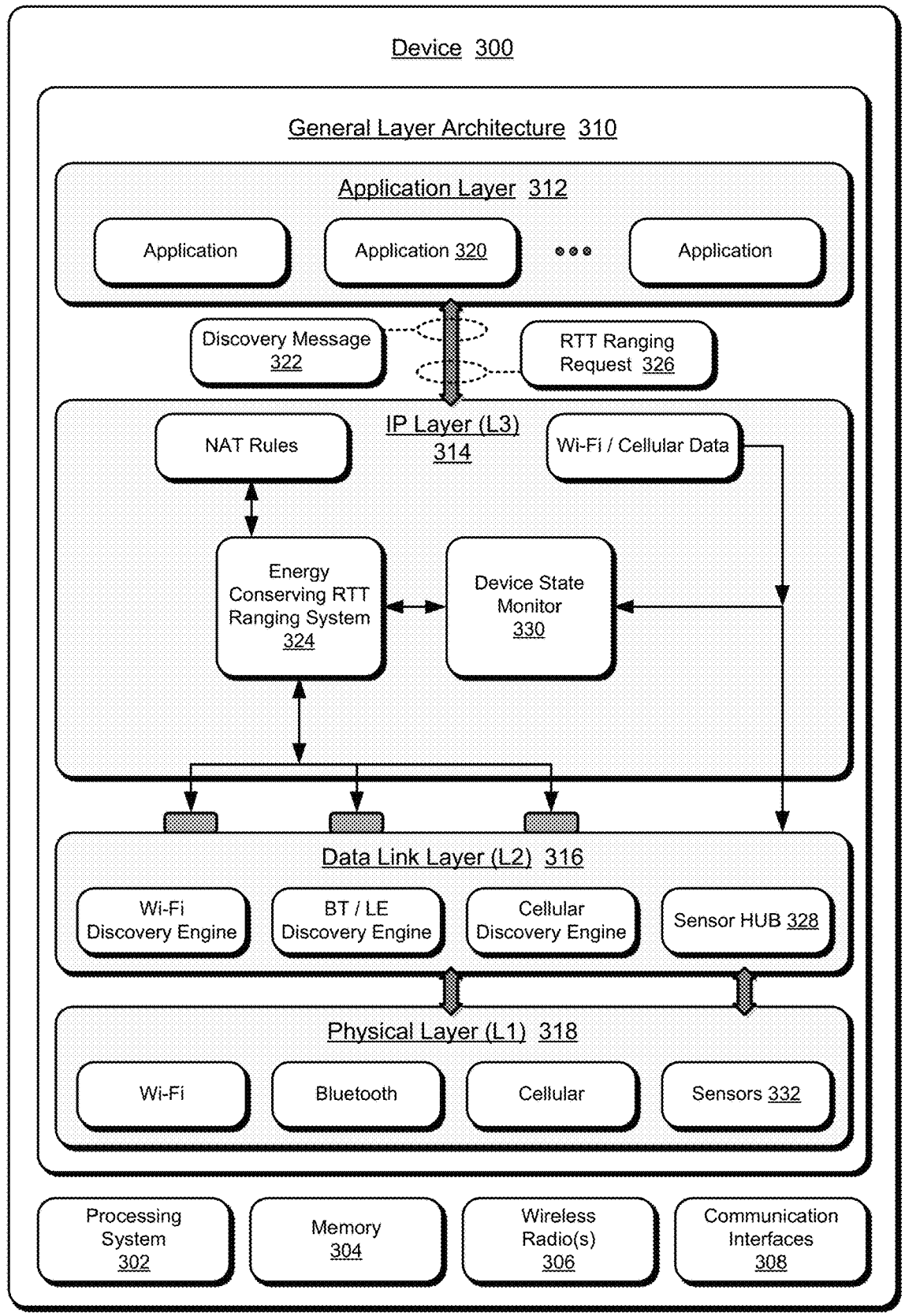
FIG. 3 illustrates an example of a device in which the performing round trip time ranging using fewer than all addresses of a wireless device can be implemented.

FIG. 3 illustrates an example of a device 300 in which the performing round trip time ranging using fewer than all addresses of a wireless device can be implemented. In this example, the device 300 is representative of any type of a computing device and/or electronic device, such as a computing device 102 of FIG. 1. Generally, the device 300 can be implemented with various components, such as a processing system 302 and memory 304, as well as any number and combination of different components as further described with reference to the example device shown in FIG. 10.

Various devices can communicate with each other via a network (e.g., WLAN) or via a direct peer-to-peer connection (e.g., Wi-Fi Direct, Bluetooth™, Bluetooth LE (BLE), RFID, etc.). The device 300 can include wireless radios 306 that facilitate wireless communications, as well as communication interfaces 308 that facilitate network communications. The device 300 can be implemented for data communication between devices and network systems, which may include wired and/or wireless networks implemented using any type of network topology and/or communication protocol, to include IP based networks, and/or the Internet, as well as networks that are managed by mobile network operators, such as a communication service providers, mobile phone providers, and/or Internet service providers.

In this example, operational aspects of the device 300 are represented with a general layer architecture 310, which is generally representative of an Internet Protocol Suite (TCP/IP four-layer model), or an Open System Interconnection Model (OSI seven-layer model), that characterizes the communication and networking functions in the device. This general layer architecture 310 is shown to have an application layer 312, an Internet protocol (IP) layer 314, a data link layer 316, and a physical layer 318. The application layer 312 includes device applications 320 (e.g., which can include an application 122 of FIG. 1) that generate and initiate to communicate data (e.g., to provide location-based services), and the application layer 312 includes the protocols used by the device applications 320 to provide user services and exchange of application data over the network connections established by the lower level protocols.

A device application 320 can initiate a discovery message 322, generally as a unicast, multicast, or broadcast message initiated for network discovery or discovery of network services. The discovery message 322 can be implemented using any of a variety of public or proprietary techniques. In implementations, the discovery message 322 may be a Simple Service Discovery Protocol (SSDP) message initiated by the device application 320 for discovery of network services, a Neighbor Discovery Protocol (NDP) message initiated by the device application 320 for network discovery, or a multicast Domain Name System (MDNS) message initiated by the device application 320 for IP address identification. Additionally, a discovery message 322 can be IP-based, or non-IP (MAC) based, such as for Wi-Fi SD or BLE advertisement. As noted above, network discovery is the process by which a computing device and other network devices (e.g., the device 300) are able to discover each other for network communication, monitor data traffic on a current network, and construct a comprehensive map of available and accessible network assets.

The IP layer 314 (also commonly referred to as "L3") of the general layer architecture 310 is representative of the data communication channels for the data messages to and from the device applications 320 in the application layer 312, and generally provides for address and routing of network connections, host addressing and identification, and packet routing. Generally, aspects of the IP layer 314 implement message transfer services, and protocols in this layer provide error control, segmentation, flow control, and bandwidth congestion control. In this example, the IP layer 314 includes an energy conserving RTT ranging system 324 that implements aspects of performing round trip time ranging using fewer than all addresses of a wireless device, as described herein and in more detail below.

The data link layer 316 (also commonly referred to as "L2") of the general layer architecture 310 generally provides for data transfer between network entity components, the transmission of internet layer data, protocols used to describe the local network topology, and the interfaces needed to effect the transmission of Internet layer datagrams. In this example, the data link layer 316 includes various discovery engines, such as for Wi-Fi, Bluetooth™ and LE, cellular (wireless), as well as a sensor HUB 328. The physical layer 318 (also commonly referred to as "L1") of the general layer architecture 310 includes the wireless radios 306 and the communication interfaces 308, as well as any other hardware electronic circuits of network communication technologies.

In one or more implementations, the energy conserving RTT ranging system 324 receives a wireless RTT ranging request 326 from the application 320. Accompanying the wireless RTT ranging request 326 is a source address list identifying source addresses of wireless devices with which RTT ranging is desired by the application. The energy conserving RTT ranging system 324 identifies situations in which multiple source addresses on the source address list are used by the same wireless device and performs wireless RTT ranging with fewer than all (e.g., only one) of the source addresses that are used by the same wireless device. The energy conserving RTT ranging system 324 can be implemented in various different manners, as discussed in more detail below.

The application 320 can select source addresses with which wireless RTT ranging is to be performed in any of a variety of different manners. For example, the application 320 may initiate a discovery message 322 and receive a response identifying source addresses of all wireless devices in wireless communication range of the device 300. By way of another example, the application 320 may receive notification of wireless beacons from other wireless devices received by the physical layer 318. The application 320 can, for example, add all wireless devices in wireless communication range of the device 300 to the source address list, can add a particular number (e.g., 5) wireless devices in wireless communication range of the device 300 to the source address list, can add all wireless devices in wireless communication range of the device 300 of a particular type (e.g., wireless access points) to the source address list, and so forth.

Although illustrated as being implemented in the IP layer 314, additionally or alternatively the energy conserving RTT ranging system 324 can be implemented in other layers of the general layer architecture 310. For example, the energy conserving RTT ranging system 324 can be implemented in the data link layer 316, or in the application layer 312.

In one or more implementations, the data link layer 316 includes a sensor HUB 328, via which a device state monitor 330 can receive sensor data from device sensors 332 to determine a device state of the device 300. The device sensors 332 can include a camera, RF-based sensors, and/or motion sensors, such as may be implemented as components of an inertial measurement unit (IMU). The motion sensors can be implemented with various sensors, such as a gyroscope, an accelerometer, and/or other types of motion sensors to sense motion of the device. The device state monitor 330 can determine the device state of the device 300 based on input from one or more of the device sensors 332, which indicate that the device is in a stationary mode or in a vehicle mode. Notably, wireless RTT ranging may be extraneous (e.g., unneeded, irrelevant) if the device state of the device 300 is in either the stationary mode or in the vehicle mode, due to the device 300 generally not moving, or moving too fast to meaningfully perform RTT ranging.

Additionally or alternatively, the device state monitor 330 can determine the device state based on cellular data and/or Wi-Fi data, which is generally available at the lower layer from any one of the connectivity transport modules, such as from a Bluetooth™ driver and/or firmware; from a WLAN driver and/or firmware; from a WAN driver and/or firmware; and the like. The device state monitor 330 can be implemented to access the cellular and/or Wi-Fi data via these various transport modules through the sensor HUB 328, or by a direct data call to the various transport modules. In implementations, the device state monitor 330 can determine the device state based on a cellular data threshold change that indicates the device is stationary or rapidly moving, and/or based on a Wi-Fi data threshold change that indicates the device is stationary or rapidly moving, such as in a vehicle.

A determination of the device state based on cellular data and/or Wi-Fi data can still be performed if an implementation version of the device 300 does not include the device sensors 332. Any one or combination of data obtained from the device sensors 332, from cellular data, or from Wi-Fi data can be used by the device state monitor 330 to reduce wireless RTT ranging in the device 300. As an extension of the aspects of performing wireless RTT ranging using a single one of multiple source addresses, if the device state monitor 330 determines the device state as the device 300 being in a vehicle mode (e.g., in a train, in a car, or on an airplane), then subsequent wireless RTT ranging need not be performed. As trains are detected to be often halting and then resuming, the wireless RTT ranging can be restarted to determine new devices and/or services that are available at a current location of the device 300.

Figure 4:
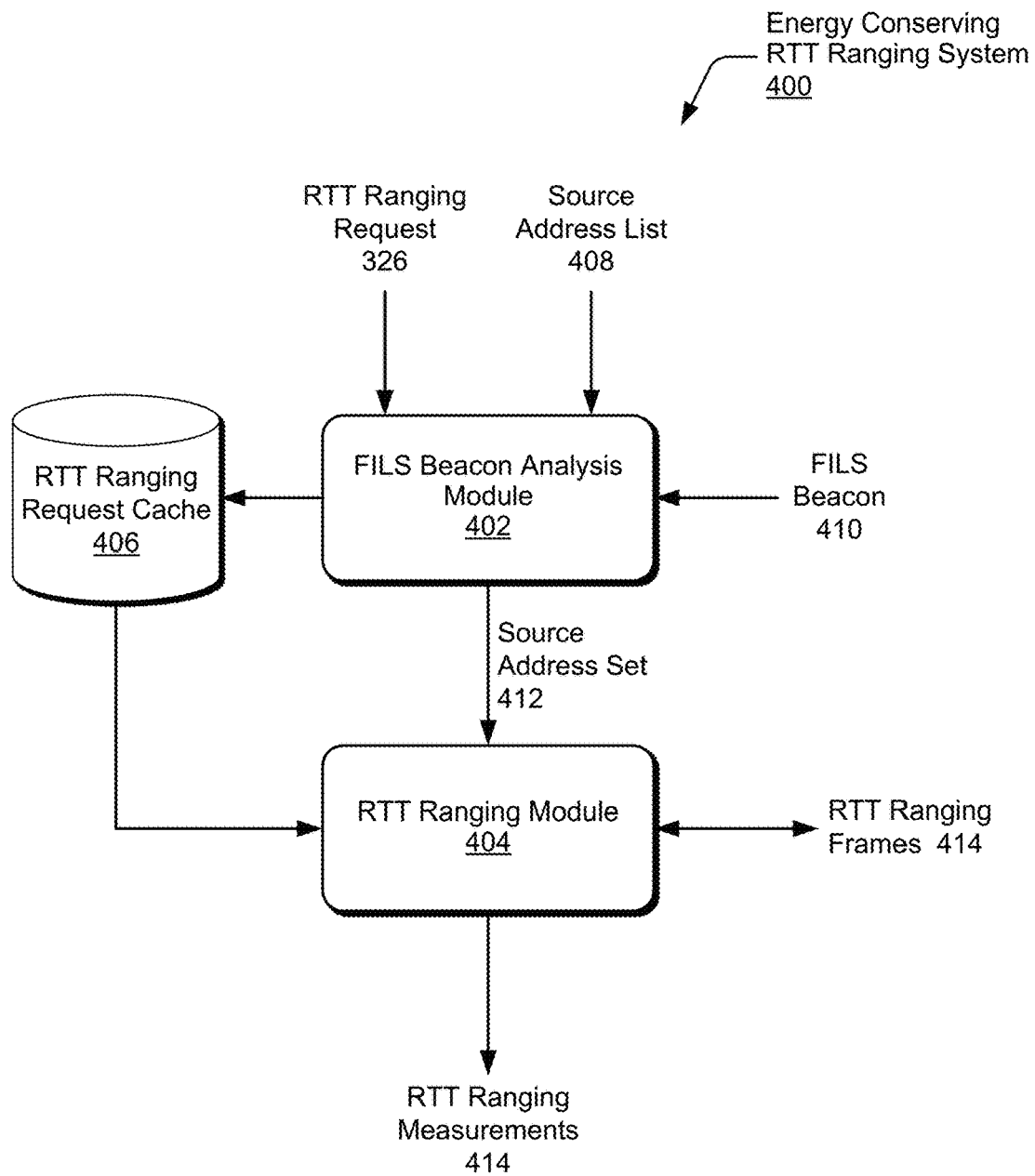
FIG. 4 illustrates an example of an energy conserving RTT ranging system in accordance with implementations of performing round trip time ranging using fewer than all addresses of a wireless device.

FIG. 4 illustrates an example of an energy conserving RTT ranging system 400 in accordance with implementations of performing round trip time ranging using fewer than all addresses of a wireless device. The energy conserving RTT ranging system 400 is an example implementation of the energy conserving RTT ranging system 324 of FIG. 3. The energy conserving RTT ranging system 400 includes a FILS beacon analysis module 402, an RTT ranging module 404, and an RTT ranging request cache 406.

The FILS beacon analysis module 402 receives the RTT ranging request 326 and an accompanying source address list 408. The source address list 408 is a list of source addresses that the application 122 desires to be RTT ranged with. The FILS beacon analysis module 402 temporarily stores the RTT ranging request 326 in the RTT ranging request cache 406 while determining whether any source address in the source address list 408 correspond to the same wireless device. The RTT ranging request cache 406 can be RAM or any of a variety of different types of memory or storage devices.

The FILS beacon analysis module 402 receives a FILS beacon 410 from a wireless device 104. A FILS beacon is a short beacon broadcast by the wireless device 104 to advertise its presence. In one or more implementations, the FILS beacon is a FILS beacon as discussed in IEEE 802.11ai. The FILS beacon is shorter (contains less information) than traditional beacons used in discovery but is transmitted more frequently.

The FILS beacon is a FILS discovery frame that includes a BSSID field indicating one or more BSSIDs used by the wireless device 104. The FILS discovery frame also includes a Multiple BSSID Support field that is a bit set to one value (e.g., 1) to indicate that the wireless device 104 supports multiple BSSIDs, and set to another value (e.g., 0) to indicate that the wireless device 104 does not support multiple BSSIDs.

The FILS beacon analysis module 402 receives the FILS beacon 410 and determines whether the Multiple BSSID support field indicates that the wireless device 104 supports multiple BSSIDs. If the wireless device 104 supports multiple BSSIDs, the FILS beacon analysis module 402 identifies the multiple BSSIDs included in the BSSID field of the FILS beacon 410. The BSSIDs used by the wireless device 104 are also identifiers of source addresses used by the wireless device 104, and the FILS beacon analysis module 402 compares the BSSIDs in the BSSID field of the FILS beacon 410 to the source addresses on the source address list 408. If two or more of the source addresses on the source address list 408 are BSSIDs in the BSSID field of the FILS beacon 410, then the FILS beacon analysis module 402 selects one of those two or more source addresses on the source address list 408 to perform RTT ranging with.

The FILS beacon analysis module 402 generates a set of source addresses with which to perform wireless RTT ranging, illustrated as source address set 412. For each wireless device 104 that uses two or more source addresses that are on the source address list 408, the FILS beacon analysis module 402 includes fewer than all (e.g., only one) of those two or more source addresses in the source address set 412. If a wireless device 104 uses a single source address that is on the source address list 408, the FILS beacon analysis module 402 includes that single source address in the source address set 412.

The RTT ranging module 404 carries out the wireless RTT ranging as requested by the cached RTT ranging request 326. The RTT ranging module 404 sends and receives various RTT ranging frames 414 with each wireless device 104 as discussed above. The RTT ranging module 404 returns the resultant RTT measurements 416 to the application 122. The application 122 can then determine the location of the computing device 102 relative to the multiple wireless devices 104.

Figure 5:
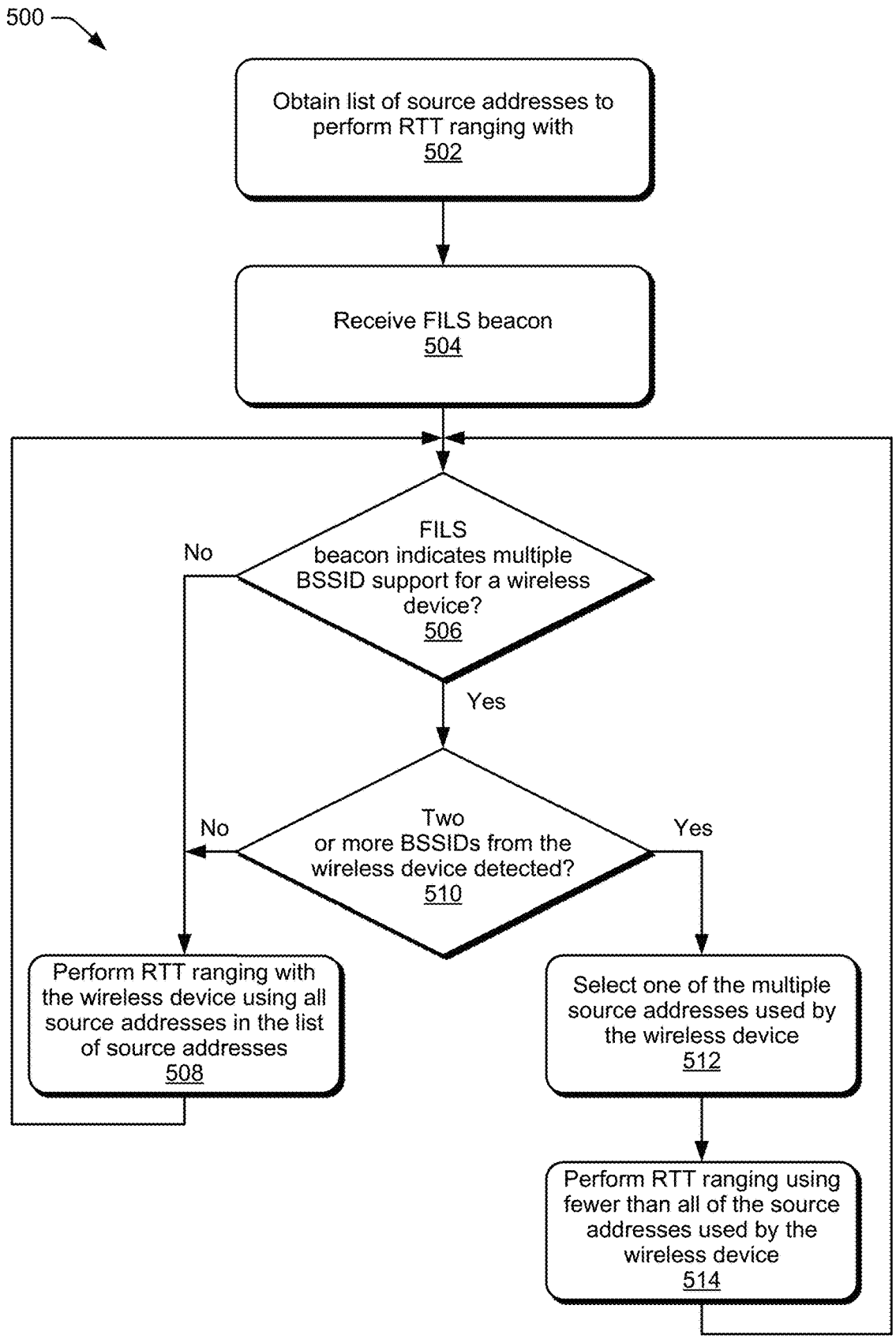
FIG. 5 illustrates an example process for implementing the techniques discussed herein in accordance with one or more embodiments.

FIG. 5 illustrates an example process 500 for implementing the techniques discussed herein in accordance with one or more embodiments. Process 500 is carried out by a computing device, such as the computing device 102 or the device 300 discussed herein, and can be implemented in software, firmware, hardware, or combinations thereof. Process 500 is shown as a set of acts and is not limited to the order shown for performing the operations of the various acts. Process 500 is performed, for example, in response to an RTT ranging request from an application.

In process 500, a list of source addresses with which to perform RTT ranging is obtained (act 502). This list of source addresses is obtained from, for example, an application on the computing device that desires to perform location-based services.

A FILS beacon is also received from a wireless device (act 504). The FILS beacon is a FILS discovery frame that includes a BSSID field indicating one or more BSSIDs used by the wireless device as discussed above.

A determination is made as to whether the FILS beacon indicates multiple BSSID support for the wireless device (act 506). This determination is made, for example, by determining whether a multiple BSSID support field in the FILS beacon is set a value indicating that the wireless device supports multiple BSSIDs.

If the FILS beacon indicates that the wireless device does not support multiple BSSIDs, then the computing device performs RTT ranging with the wireless device using all source addresses of the wireless device that are included in the list of source addresses (act 508). In this situation the wireless device uses a single source address (because the wireless device has indicated in the FILS beacon that it does not support multiple BSSIDs). The computing device performs RTT ranging using that single source address if the source address is included in the list of source addresses obtained in act 502. Otherwise, the computing device does not perform RTT ranging using that single source address. Process 500 then returns to act 504 to repeat the process when RTT ranging is to be performed again.

However, if the FILS beacon indicates that the wireless device does support multiple BSSIDs, then a check is made as to whether two or more BSSIDs from the wireless device are detected (act 510). This check is made, for example, based on the number of BSSIDs included in a BSSID field of the FILS beacon.

If two or more BSSIDs from the wireless device are not detected, then the computing device performs RTT ranging with the wireless device using all source addresses of the wireless device that are included in the list of source addresses (act 508). In this situation the wireless device uses a single source address (because there is a single BSSID in the BSSID field of the FILS beacon).

However, if two or more BSSIDs from the wireless device are detected, then at least one of the multiple source addresses used by the wireless device is selected (act 512). This selection is a selection of fewer than all of the multiple source addresses used by the wireless device to communicate management frames, and in one or more implementations is a single one of the multiple source addresses used by the wireless device. This selection can be made in any of a variety of different manners, such as randomly selecting at least one of the multiple source addresses, selecting the first source address listed in the FILS beacon, and so forth. In situations in which all of the source addresses used by the wireless device are not included in the list of source addresses obtained in act 502, the selection of at least one source address is made from the source addresses that are used by the wireless device and are included on the list of source addresses obtained in act 502.

The computing device performs RTT ranging with the wireless device using fewer than all of the source address of the multiple source addresses used by the wireless device (act 514). RTT ranging is performed using the selected at least one of the multiple source addresses used by the wireless device (e.g., a single one of the multiple source addresses used by the wireless device). Process 500 then returns to act 504 to repeat the process when RTT ranging is to be performed again.

It should be noted that acts 504-514 are repeated for each wireless device corresponding to at least one source address on the list of source addresses. Thus, for example, one wireless device may use a single source address and the computing device performs RTT ranging with that wireless device using that single source address in act 508. However, another wireless device may use multiple source addresses that are on the list of source addresses, and the computing device performs RTT ranging with that wireless device using only the selected at least one source address of the multiple source addresses in act 514.

Figure 6:
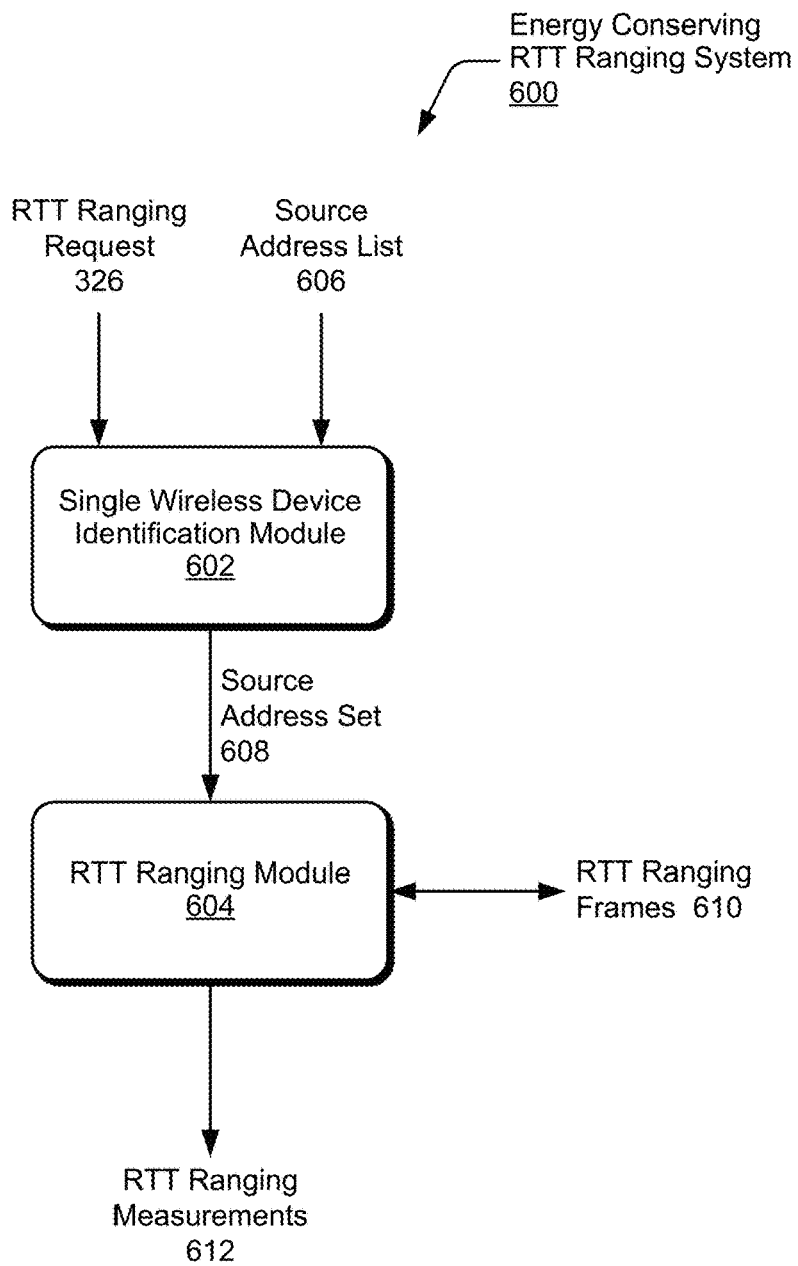
FIG. 6 illustrates an example of an energy conserving RTT ranging system in accordance with implementations of performing round trip time ranging using fewer than all addresses of a wireless device.

FIG. 6 illustrates an example of an energy conserving RTT ranging system 600 in accordance with implementations of performing round trip time ranging using fewer than all addresses of a wireless device. The energy conserving RTT ranging system 600 is an example implementation of the energy conserving RTT ranging system 324 of FIG. 3. The energy conserving RTT ranging system 600 includes a single wireless device identification module 602 and an RTT ranging module 604.

The single wireless device identification module 602 receives the RTT ranging request 326 and an accompanying source address list 606. The source address list 606 is a list of source addresses that the application 122 desires to be RTT ranged with. The single wireless device identification module 602 determines, based on the source address list 606, whether any of the source addresses on the same list are used by the same wireless device. A single wireless device can use multiple source addresses for various purposes as discussed above, such as for different bands, for different services, and so forth.

The single wireless device identification module 602 can determine whether multiple source addresses are being used by the same device in a variety of different manners. In one or more embodiments, the single wireless device identification module 602 determines whether multiple source addresses are being used by the same wireless device by analyzing organizationally unique identifiers (OUIs) included in management frames communicated by the wireless devices 104. The OUI is a 24-bit number that uniquely identifies a vendor or manufacturer of a device or component and is typically the first three octets of a MAC address included in a management frame. A wireless device 104 can support multiple MAC addresses such that each management frame transmitted by the device includes one of the multiple MAC addresses associated with a respective service of the wireless device. For example, a dual-band access point (2.4 GHz/5.0 GHz) can have two BSSIDs that are associated with the respective 2.4 GHz and 5.0 GHz frequency bands. The management frames transmitted by the dual-band access point at 2.4 GHz have one MAC address, and the management frames transmitted at 5.0 GHz have a different MAC address. Both MAC addresses share the same first three octets of the MAC address because a chipset that implements services of the dual-band access point is produced by a single vendor or manufacturer (and the first three octets of the MAC address being with a threshold difference). The last three octets of the MAC addresses are Network Interface Controller (NIC) specific, and typically the last three octets of the MAC addresses are different, notably the difference between the last three octets (non-OUI portion) of the two MAC addresses is at most sixteen (16) or thirty-two (32).

As an example, management frames transmitted by the 2.4 GHz radio of the dual-band access point has a MAC address of "70:3A:CB:4B:AC:EB", and management frames transmitted by the 5.0 GHz radio of the dual-band access point has a MAC address of "70:3A:CB:4B:AC:E7". In this example, both MAC addresses have the first three octets of the MAC addresses in common, which corresponds to a particular vendor and/or manufacturer associated with the first three octets of the MAC address (e.g., "70:3A:CB: . . . "). The last octet (non-OUI portion) of the MAC addresses is different by at most sixteen (16) or thirty-two (32)—"70:3A:CB:4B:AC:EB" vs "70:3A:CB:4B:AC:E7".

The single wireless device identification module 602 can be implemented to determine that management frames received using a common communication protocol in separate data messages from the wireless device 104 are communicated from a single wireless device 104 based in part on an OUI lookup of MAC addresses included in the management frames. In the example described above, the dual-band access point has different MAC addresses associated with the 2.4 GHz and 5.0 GHz radios, where the first three octets of the MAC addresses are the same and the last octet (non-OUI portion) of the source addresses are different by at most sixteen (16) or thirty-two (32). The single wireless device identification module 602 can determine that the management frames are communicated from the same wireless device 104 based on the first three octets of the MAC addresses corresponding to a common vendor and/or manufacturer and the last three octets of the MAC addresses being within a threshold difference. Although the examples discussed above refer to a dual-band access point, it should be noted that an access point or another wireless device can be multi-band (e.g., two or more bands) and is not limited to being dual-band.

The single wireless device identification module 602 can additionally or alternatively be implemented to determine that received management frames using different communication protocols in separate data messages from the wireless device 104 are communicated from a single wireless device 104 based in part on an OUI lookup of MAC addresses included in the management frames. For example, an IoT device includes two different radios that communicate using different communication protocols. The two different radios can be a Wi-Fi radio and a Bluetooth™ radio, and each radio is associated with a different pre-programmed MAC address (i.e., source address). The wireless device 200 can receive a first management frame having a source address that is associated with the Wi-Fi radio, and receive a second management frame having a source address that is associated with the Bluetooth™ radio. The single wireless device identification module 602 can determine that the management frames are communicated from a single wireless device 104 based on the first three octets of the MAC addresses corresponding to a common vendor and/or manufacturer and the last three octets being within a threshold difference.

In one or more implementations, the wireless device 104 includes a single wireless radio 116 having a single MAC OUI. The wireless device 104 can be implemented to publish services (e.g., the first service 118 and second service 120) using locally administered MAC addresses. Universally administered and locally administered MAC address are distinguished by the second-least-significant bit of the first octet of the address, also referred to as the Universal/Local (U/L) bit, that identifies how the address is administered. If the U/L bit is zero, then the address is universally administered, and if the U/L bit is one, then the address is locally administered. For example, a source address of "06:00:00:00:00:00" has a binary form of "0000 0110" for the first octet of the source address. The second-least-significant bit of the first octet is set to one, thus the source address is a locally administered address. In this way, the wireless device 104 can utilize a single wireless radio 116 to generate separate MAC addresses associated with the first and second services 118, 120 provided by the wireless device 104.

The single wireless device identification module 602 can thus detect that one or more source addresses are locally administered addresses. The single wireless device identification module 602 can compute back a locally administered source address to the universal administered source address. The single wireless device identification module 602 can then perform the OUI lookup as described above to determine that multiple locally administered source addresses included in the management frames are communicated from a single wireless device 104, or that a single locally administered source address is communicated from the same wireless device as a universal administered source address. Notably, a device which supports multiple MAC will have the same OUI (e.g., a non-OUI), and primarily, the last octet will differ by the order of two. For example, an access point which is DBDC (Dual Band Dual Cell) will have two service set identifiers (SSIDs) each on the 2.4 GHz band and the 5.0 GHz band, respectively.

Additionally or alternatively, the single wireless device identification module 602 can determine whether multiple source addresses are being used by the same wireless device by analyzing RSSI values of signals received from the wireless devices 104. The single wireless device identification module 602 can compare the RSSI values of multiple received management frames. The single wireless device identification module 602 can determine that two management frames having RSSI values within a threshold amount of one another (e.g., 7 decibels or less) are received from the same wireless device 104. Given the source addresses included in two such management frames, the single wireless device identification module 602 can determine that the source addresses included in those two management frames are used by the same wireless device 104.

Additionally or alternatively, the single wireless device identification module 602 can determine whether multiple source addresses are being used by the same wireless device by analyzing transmit power control (TPC) reports signals received from the wireless devices 104. Transmit power control is a feature of IEEE 802.11h, as an amendment added to the IEEE 802.11 standard, which enables an access point to define local rules for maximum transmit power for clients and other access points. Transmit power control is a mechanism to reduce the power of a radio to the minimum necessary to maintain the link with a certain quality and allows devices to avoid interference into other devices and/or to extend the battery life of devices.

The TPC reports indicate a transmit power and link margin associated with the received management frames. In one or more implementations, the single wireless device identification module 602 can be implemented to request a TPC report for the management frames that include different source addresses. In other implementations, the TPC reports may be included with the management frames and the single wireless device identification module 602 can parse the management frames to obtain the TPC reports. The TPC reports can be utilized by the single wireless device identification module 602 to determine whether a wireless device 104 (e.g., a dual-band access point) has a same chipset having multiple distinct radios. By comparing the TPC reports, the single wireless device identification module 602 can distinguish the device that has multiple distinct radios. If the TPC reports are the same or within a threshold difference, then the single wireless device identification module 602 determines that the received management frames are communicated from a same wireless device 104. Otherwise, the single wireless device identification module 602 can determine that the received management frames are communicated from separate wireless devices.

If two or more of the source addresses on the source address list 606 are used by the same wireless device, then the single wireless device identification module 602 selects one of those two or more source addresses on the source address list 606 to perform RTT ranging with. The single wireless device identification module 602 generates a set of source addresses with which to perform wireless RTT ranging, illustrated as source address set 608. For each wireless device 104 that uses two or more source addresses that are on the source address list 606, the single wireless device identification module 602 includes fewer than all (e.g., only one) of those two or more source addresses in the source address set 608. If a wireless device 104 uses a single source address that is on the source address list 606, the single wireless device identification module includes that single source address in the source address set 608.

The RTT ranging module 604 carries out the wireless RTT ranging as requested by the RTT ranging request 326. The RTT ranging module 604 sends and receives various RTT ranging frames 610 with each wireless device 104 as discussed above. The RTT ranging module 604 returns the resultant RTT measurements 612 to the application 122. The application 122 can then determine the location of the computing device 102 relative to the multiple wireless devices 104.

Figure 7:
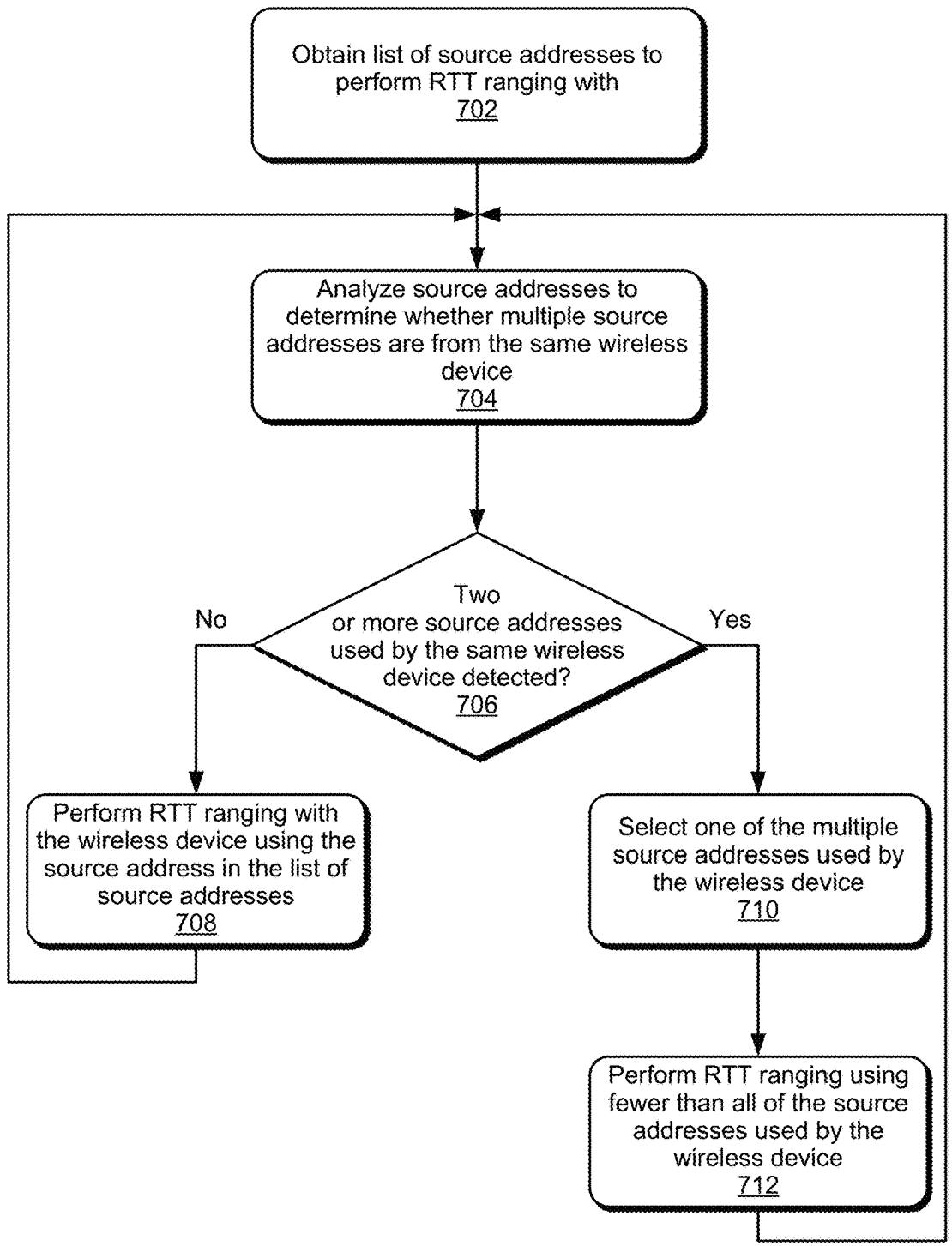
FIG. 7 illustrates another example process for implementing the techniques discussed herein in accordance with one or more embodiments.

FIG. 7 illustrates an example process 700 for implementing the techniques discussed herein in accordance with one or more embodiments. Process 700 is carried out by a computing device, such as the computing device 102 or the device 300 discussed herein, and can be implemented in software, firmware, hardware, or combinations thereof. Process 700 is shown as a set of acts and is not limited to the order shown for performing the operations of the various acts. Process 700 is performed, for example, in response to an RTT ranging request from an application.

In process 700, a list of source addresses with which to perform RTT ranging is obtained (act 702). This list of source addresses is obtained from, for example, an application on the computing device that desires to perform location-based services.

The source addresses on the list of source addresses are analyzed to determine whether multiple source addresses are from the same wireless device (act 704). This determination is made, for example, by analyzing OUIs included in management frames communicated by a wireless device, by analyzing RSSI values of signals received from a device, by analyzing TPC reports signals received from a wireless device 104, and so forth.

A determination is made whether two or more source addresses used by the same wireless device are detected (act 706). If two or more source addresses used by the same wireless device are not detected (or only one of the source addresses used by the wireless device is on the list of source addresses), then the wireless device uses a single source address. The computing device performs RTT ranging with the wireless device using that single source address (act 708). Process 700 then returns to repeat the process when RTT ranging is to be performed again.

However, if two or more source addresses used by the same wireless device are detected, then at least one of the multiple source addresses used by the wireless device is selected (act 710). This selection is a selection of fewer than all of the multiple source addresses used by the wireless device to communicate management frames, and in one or more implementations is a single one of the multiple source addresses used by the wireless device. This selection can be made in any of a variety of different manners, such as randomly selecting at least one of the multiple source addresses, selecting the source address that occurs earliest in the list of source addresses, and so forth.

The computing device performs RTT ranging with the wireless device using fewer than all of the source address of the multiple source addresses used by the wireless device (act 712). RTT ranging is performed using the selected at least one of the multiple source addresses used by the wireless device (e.g., a single one of the multiple source addresses used by the wireless device). Process 700 then returns to repeat the process when RTT ranging is to be performed again.

It should be noted that acts 706-712 are repeated for each wireless device corresponding to at least one source address on the list of source addresses. Thus, for example, one wireless device may use a single source address and the computing device performs RTT ranging with that wireless device using that single source address in act 708. However, another wireless device may use multiple source addresses that are on the list of source addresses, and the computing device performs RTT ranging with that wireless device using only the selected one source address of the multiple source addresses in act 712.

Figure 8:
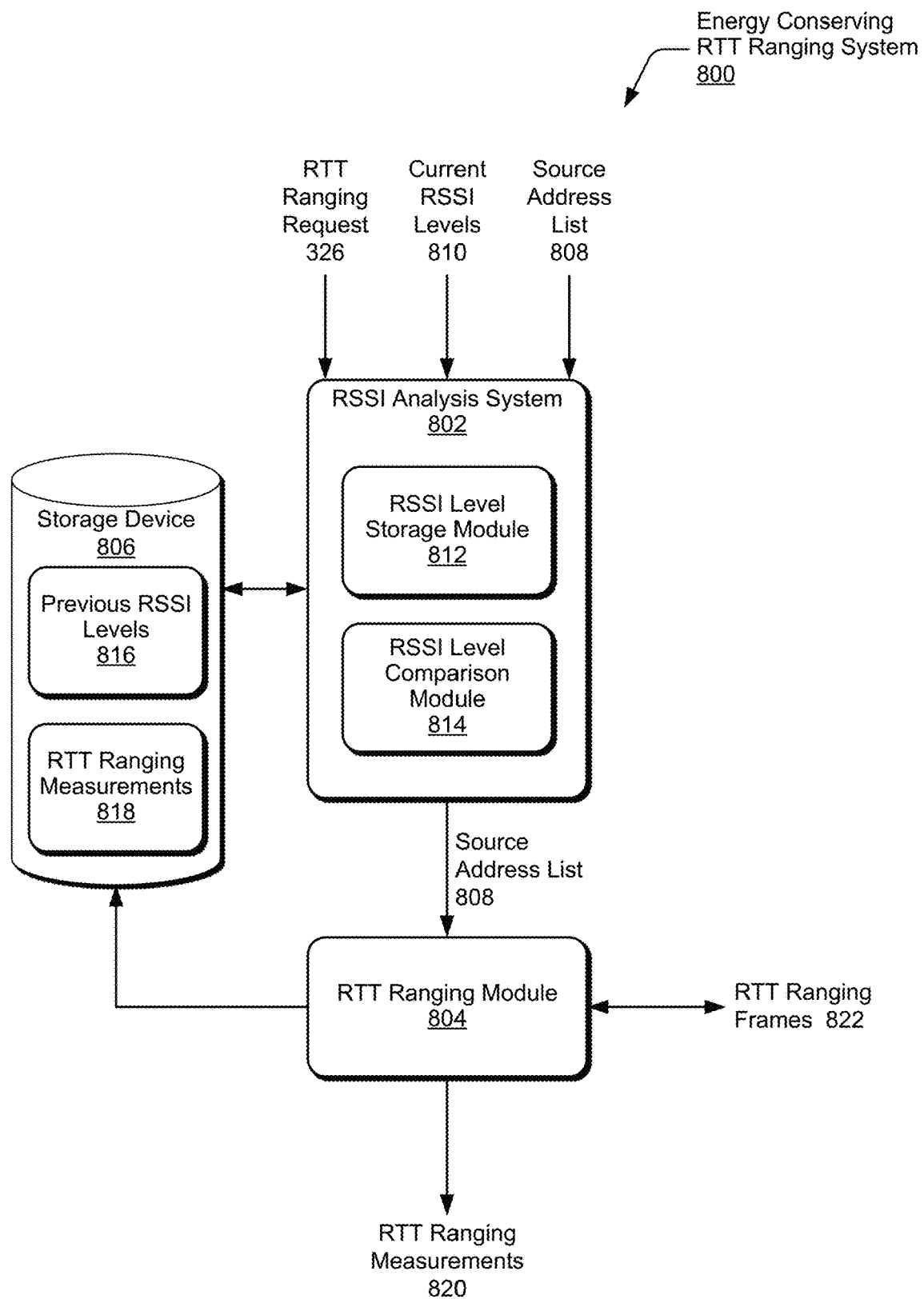
FIG. 8 illustrates an example of an energy conserving RTT ranging system in accordance with implementations of performing round trip time ranging using fewer than all addresses of a wireless device.

FIG. 8 illustrates an example of an energy conserving RTT ranging system 800 in accordance with implementations of performing round trip time ranging using fewer than all addresses of a wireless device. The energy conserving RTT ranging system 800 is an example implementation of the energy conserving RTT ranging system 324 of FIG. 3. The energy conserving RTT ranging system 800 includes an RSSI analysis system 802, an RTT ranging module 804, and a storage device 806.

The RSSI analysis system 802 receives the RTT ranging request 326 and an accompanying source address list 808. The source address list 808 is a list of source addresses that the application 122 desires to be RTT ranged with. The RSSI analysis system 802 also obtains current RSSI levels 810. The current RSSI levels 810 are received signal strength indicators for each of the source addresses in the source address list 808.

In one or more embodiments, the current RSSI levels 810 are received from the application 122. For example, the RSSI levels for each source address can be received by the application 122 in response to a discovery message, and the application 122 can provide these RSSI levels to the energy conserving RTT ranging system 800 along with the source address list 808. Additionally or alternatively, the current RSSI levels can be received from other applications, programs, or modules. For example, in response to the RTT ranging request, the RSSI analysis system 802 can request the current RSSI levels for the source addresses on the source address list 808 from an operating system program on the computing device 102.

The RSSI analysis system 802 includes an RSSI level storage module 812 and an RSSI level comparison module 814. In response to the RTT ranging request 326, the RSSI level comparison module retrieves previous RSSI levels 816 from the storage device 806. The storage device 806 can be RAM or any of a variety of different types of memory or storage devices. The previous RSSI levels 816 are the RSSI levels that were received with or in response to the most recently previously received RTT ranging request.

The RSSI level comparison module 814 compares the previous RSSI levels 816 to the current RSSI levels 810. If there is an RSSI value in the previous RSSI levels 816 for each RSSI level in the current RSSI levels 810, and the difference between each corresponding RSSI level (RSSI levels from the same source address) is less than a threshold amount (e.g., 10 decibels), then the RSSI analysis system 802 does not perform RTT ranging. Rather, the RSSI level comparison module 814 retrieves previously stored RTT ranging measurements 818 from the storage device 806. The RTT ranging measurements 818 are RTT ranging measurements previously made by the RTT ranging module 804. The RTT ranging measurements 818 are returned to the application 122 as RTT ranging measurements 820. Additionally or alternatively, rather than storing and returning the previous RTT ranging measurements 818 to the application 122, the RTT ranging module 804 can return a response to the application 122 informing the application 122 that there has been no change in RTT ranging measurements since the last RTT ranging request from the application 122.

In contrast, if there is not an RSSI value in the previous RSSI levels 816 for each RSSI level in the current RSSI levels 810, or the difference between at least one pair of corresponding RSSI levels (previous and current RSSI levels from the same source address) is not less than a threshold amount (e.g., 10 decibels), then the RSSI analysis system 802 does perform RTT ranging. The RSSI analysis system 802 forwards the source address list 808 to the RTT ranging module 804. The RTT ranging module 804 carries out the wireless RTT ranging as requested by the RTT ranging request 326. The RTT ranging module 804 sends and receives various RTT ranging frames 822 with each wireless device 104 as discussed above. The RTT ranging module 804 returns the resultant RTT ranging measurements 820 to the application 122. The application 122 can then determine the location of the computing device 102 relative to the multiple wireless devices 104.

In one or more embodiments, in response to performing the RTT ranging, the RTT ranging module 804 also stores the RTT ranging measurements 820 in the storage device 806 as RTT ranging measurement 818. The previously stored RTT ranging measurements 818 can be overwritten by the new RTT ranging measurements. Thus, the most recently generated RTT ranging measurements are stored in the storage device 806 and can be used by the RSSI level comparison module 814 as discussed above.

Additionally, in one or more embodiments the RSSI level storage module 812 stores the current RSSI levels 810 in the storage device 806. The previously stored RSSI levels 816 can be overwritten by the current RSSI levels 810. In one or more implementations, the RSSI level storage module 812 stores the current RSSI levels 810 each time the current RSSI levels 810 are received by the RSSI analysis system 802. Additionally or alternatively, the RSSI level storage module 812 stores the current RSSI levels 810 only in response to one or more events, such as the RSSI level comparison module 814 determining that there is not an RSSI value in the previous RSSI levels 816 for each RSSI level in the current RSSI levels 810, or the difference between at least one pair of corresponding RSSI levels is not less than the threshold amount.

Figure 9:
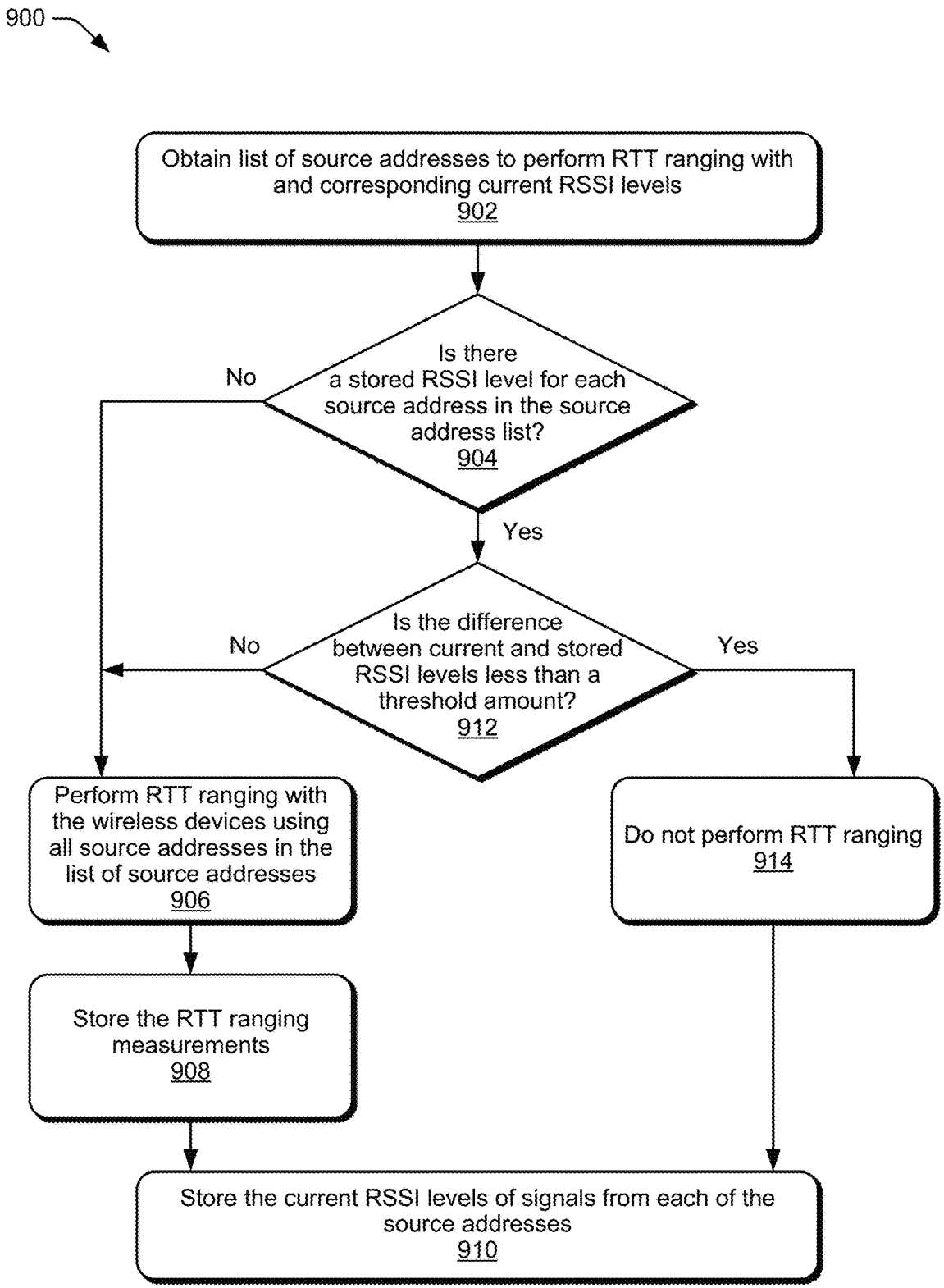
FIG. 9 illustrates another example process for implementing the techniques discussed herein in accordance with one or more embodiments.

FIG. 9 illustrates an example process 900 for implementing the techniques discussed herein in accordance with one or more embodiments. Process 900 is carried out by a computing device, such as the computing device 102 or the device 300 discussed herein, and can be implemented in software, firmware, hardware, or combinations thereof. Process 900 is shown as a set of acts and is not limited to the order shown for performing the operations of the various acts. Process 900 is performed, for example, in response to an RTT ranging request from an application.

In process 900, a list of source addresses with which to perform RTT ranging and corresponding current RSSI levels are obtained (act 902). This list of source addresses is obtained from, for example, an application on the computing device that desires to perform location-based services. The current RSSI levels can be obtained from the application, or another program or module of the computing device.

A determination is made as to whether there is a stored RSSI level for each source address in the source address list (act 904). The stored RSSI levels are RSSI levels corresponding to source addresses with which RTT ranging was previously performed or requested.

If there is not a stored RSSI level for each source address in the source address list, then the computing device performs RTT ranging with the wireless devices using all source addresses that are included in the list of source addresses (act 906). The RTT measurements resulting from performing the RTT ranging are optionally stored (act 908). These stored RTT measurements can optionally be returned again to an application in situations where RTT ranging is not performed.

The current RSSI levels of signals received from each of the source addresses are also stored (act 910). These RSSI levels are the RSSI levels obtained in act 902.

Returning to act 904, if there is a stored RSSI level for each source address in the source address list, then a determination is made whether the difference between the current and stored RSSI levels is less than a threshold amount (act 912). This threshold amount is, for example, 8 to 12 decibels. The determination is made between each pair of corresponding RSSI levels. A pair of corresponding RSSI levels refer to the stored RSSI level corresponding to the signal received from a wireless device and the current RSSI level corresponding to the signal received from the same wireless device.

If the difference between the current RSSI level and the stored RSSI level for at least pair of corresponding RSSI levels is not less than the threshold amount, then the computing device performs RTT ranging with the wireless devices using all source addresses that are included in the list of source addresses (act 906). The RTT measurements resulting from performing the RTT ranging are optionally stored (act 908). Additionally, the current RSSI levels of signals received from each of the source addresses are stored (act 910).

However, if the difference between the current RSSI level and the stored RSSI level for every pair of corresponding RSSI levels is less than the threshold amount, then the computing device does not perform RTT ranging (act 914). Previously stored RTT measurements can be returned to the application in act 914, or an indication that there is no change in RTT measurements can be returned to the application in act 914. RTT ranging is not performed in act 914 because it is assumed that the computing device is not moving (or is moving very little) since the RSSI levels from all of the source addresses in the source address list have changed by less than a threshold amount.

The current RSSI levels of signals received from each of the source addresses are also optionally stored (act 910). These RSSI levels are the RSSI levels obtained in act 902. Additionally or alternatively, the current RSSI levels may not be stored and the previously stored RSSI levels remain stored.

Various different example implementations of an energy conserving RTT ranging system are discussed herein. It should be noted that these example implementations can be implemented individually or in combination. For example, the techniques discussed above with reference to energy conserving RTT ranging system 400 can be combined with the techniques discussed above with reference to energy conserving RTT ranging system 600. E.g., a single wireless device using multiple source addresses can be detected using any one or more of a combination of analyzing a FILS beacon to identify different BSSIDs used by a wireless device, analyzing OUIs included in management frames communicated by a wireless device, analyzing RSSI values of signals received from a wireless device, and analyzing TPC reports signals received from a wireless device. By way of another example, the techniques discussed above with reference to one or both of energy conserving RTT ranging system 400 and energy conserving RTT ranging system 600 can be combined with the techniques discussed above with reference to energy conserving RTT ranging system 800. E.g., if the difference between the current RSSI level and the stored RSSI level for at least a pair of corresponding RSSI levels is not less than the threshold amount, then the computing device performs RTT ranging with a wireless device using fewer than all (e.g., a single one) of the source addresses that are included in the list of source addresses.

Generally, any services, components, modules, methods, or operations described herein can be implemented using the software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Additionally or alternatively, any of the functionality described herein can be performed, at least in part, by one or more hardware logic components, such as, and without limitation, Field-programmable Gate Arrays (FPGAs), Application-specific Integrated Circuits (ASIC s), Application-specific Standard Products (ASSPs), System-on-a-chip systems (SoCs), Complex Programmable Logic Devices (CPLDs), and the like.

Figure 10:
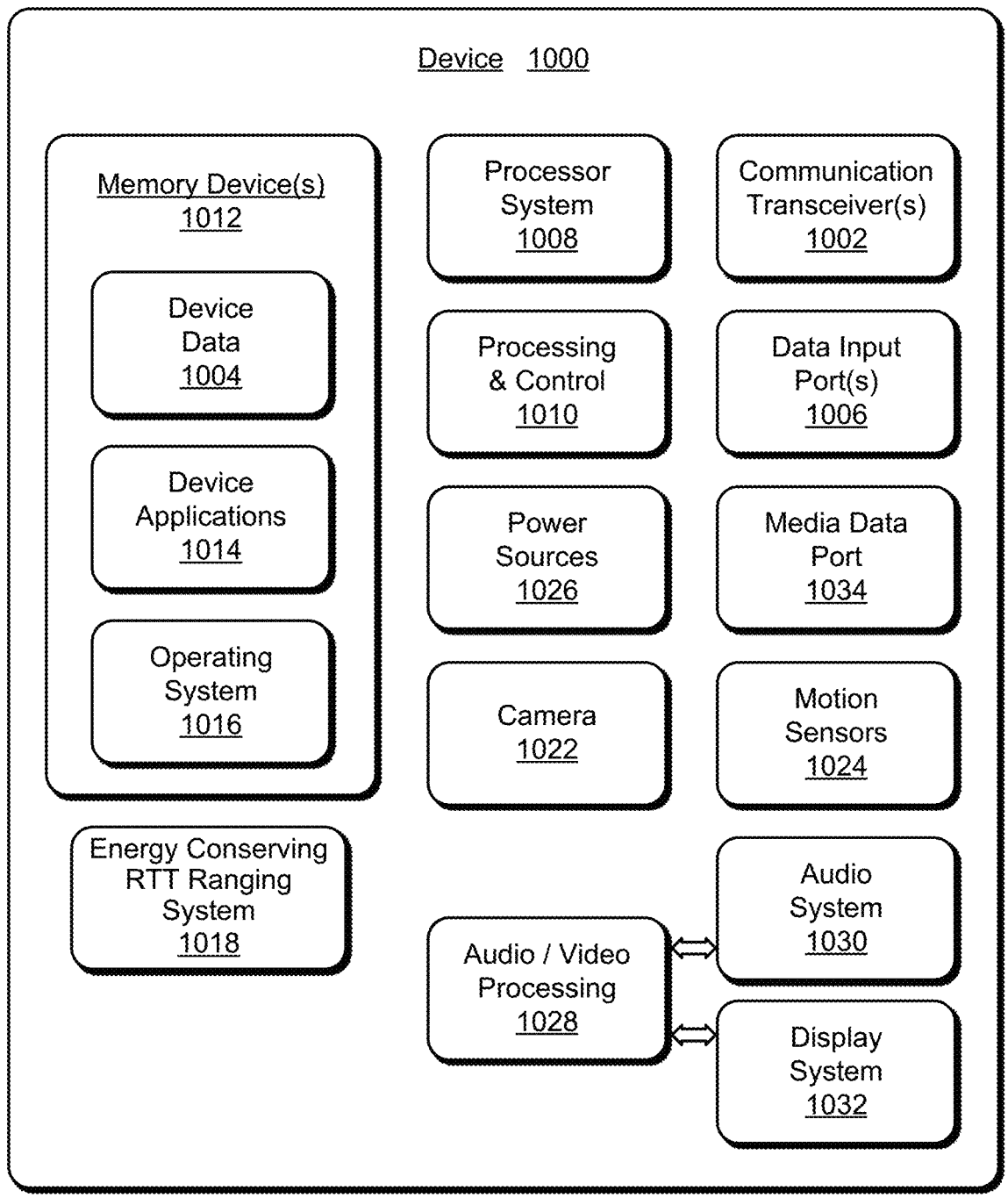
FIG. 10 illustrates various components of an example device that can implement aspects of performing round trip time ranging using fewer than all addresses of a wireless device.

FIG. 10 illustrates various components of an example device 1000, in which aspects of performing round trip time ranging using fewer than all addresses of a wireless device can be implemented. The example device 1000 can be implemented as any of the devices described with reference to FIGS. 1-9, such as any type of a device, mobile device, access point, node device, IoT device, mobile phone, client device, wearable device, tablet, computing device, communication device, entertainment device, gaming device, media playback device, and/or other type of electronic device. For example, the computing device 102 shown and described with reference to FIG. 1 may be implemented as the example device 1000. Further a wearable device may include any one or combination of a watch, armband, wristband, bracelet, glove or pair of gloves, glasses, jewelry items, clothing items, any type of footwear or headwear, and/or other types of wearables.

The device 1000 includes communication transceivers 1002 that enable wired and/or wireless communication of device data 1004 with other devices. The device data 1004 can include any of the frames used in wireless RTT ranging. Additionally, the device data 1004 can include any type of audio, video, and/or image data. Example communication transceivers 1002 include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.16 (WiMAX™) standards, and wired local area network (LAN) Ethernet transceivers for network data communication.

The device 1000 may also include one or more data input ports 1006 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 1000 includes a processor system 1008 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 1010. The device 1000 may further include any type of a system bus or other data and command transfer system that couples the various components within the device. A system bus can include any one or combination of different bus structures and architectures, as well as control and data lines.

The device 1000 also includes computer-readable storage memory 1012 (e.g., memory devices) that enable data storage, such as data storage devices that can be accessed by a computing device, and that provide persistent storage of data and executable instructions (e.g., software applications, programs, functions, and the like). Examples of the computer-readable storage memory 1012 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 1000 may also include a mass storage media device.

The computer-readable storage memory 1012 provides data storage mechanisms to store the device data 1004, other types of information and/or data, and various device applications 1014 (e.g., software applications). For example, an operating system 1016 can be maintained as software instructions with a memory device and executed by the processor system 1008. The device applications may also include a device manager, such as any form of a control application, software application, signal-processing and control module, code that is native to a particular device, a hardware abstraction layer for a particular device, and so on.

In this example, the device 1000 includes an energy conserving RTT ranging system 1018 that implements aspects of performing round trip time ranging using fewer than all addresses of a wireless device. The energy conserving RTT ranging system 1018 may be implemented with hardware components and/or in software as one of the device applications 1014, such as when the device 1000 is implemented as the device 100 described with reference to FIG. 1. Examples of the energy conserving RTT ranging system 1018 is the energy conserving RTT ranging system 124 that is implemented as a software application and/or as hardware components in the device 102, and the energy conserving RTT ranging system 324 that is implemented as a software application and/or as hardware components in the device 300. In implementations, the status module 1018 may include independent processing, memory, and logic components as a computing and/or electronic device integrated with the device 1000.

In this example, the device 1000 also includes a camera 1022 and motion sensors 1024, such as may be implemented as components of an inertial measurement unit (IMU). The motion sensors 1024 can be implemented with various sensors, such as a gyroscope, an accelerometer, and/or other types of motion sensors to sense motion of the device. The motion sensors 1024 can generate sensor data vectors having three-dimensional parameters (e.g., rotational vectors in x, y, and z coordinates) indicating position, location, and/or orientation of the device. The device 1000 can also include one or more power sources 1026, such as when the device is implemented as a mobile device. The power sources may include a charging and/or power system, and can be implemented as a flexible strip battery, a rechargeable battery, a charged super-capacitor, and/or any other type of active or passive power source.

The device 1000 can also include an audio and/or video processing system 1028 that generates audio data for an audio system 1030 and/or generates display data for a display system 1032. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1034. In implementations, the audio system and/or the display system are integrated components of the example device. Alternatively, the audio system and/or the display system are external, peripheral components to the example device.

Although implementations of performing round trip time ranging using fewer than all addresses of a wireless device have been described in language specific to features and/or methods, the subject of the appended claims is not necessarily limited to the specific features or methods described. Rather, the specific features and methods are disclosed as example implementations of performing round trip time ranging using fewer than all addresses of a wireless device, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A method comprising: determining, in a computing device, that a single wireless device is using multiple source addresses to communicate management frames; selecting one of the multiple source addresses; and performing, by the computing device, wireless round trip time (RTT) ranging with the single wireless device using the selected one of the multiple source addresses but fewer than all of the multiple source addresses used by the single wireless device to communicate management frames, the performing wireless RTT ranging with the single device including communicating multiple frames to the wireless device and receiving multiple frames from the wireless device.

Alternatively or in addition to the above described method, any one or combination of the following. Receiving a source address list from an application on the computing device, the source address list identifying multiple source addresses with which the application desires the computing device to be RTT ranged; identifying two or more source addresses on the source address list that are used by the single wireless device; and generating a source address set identifying multiple sources addresses with which the computing device is to be RTT ranged, the generating comprising including only one of the two or more source addresses in the source address set. Receiving a fast initial link setup (FILS) beacon from the single wireless device; and determining, from a basic service set identifier (BSSID) field in the FILS beacon, the multiple source addresses used by the single wireless device. Determining whether a multiple BSSID support field in the FILS beacon is set to indicate that the single wireless device supports multiple BSSIDs; and determining, in response to the multiple BSSID support field being set to indicate that the single wireless device supports multiple BSSIDs, the multiple source addresses used by the single wireless device. The determining comprising determining, based on management frames received from the single wireless device, that the single wireless device is a multi-band wireless device transmitting management frames using different BSSIDs for different ones of multiple frequency bands. The determining comprising determining that a single wireless device is using multiple source addresses to communicate management frames by determining, based on management frames received from the single wireless device, that the single wireless device is using multiple locally administered source addresses. The determining comprising determining that a single wireless device is using multiple source addresses to communicate management frames by determining, based on management frames received from the single wireless device, that the single wireless device is using at least one locally administered source address and a universal administered source address. The performing wireless RTT ranging with the single wireless device comprising performing wireless RTT ranging without connecting to the single wireless device. The performing wireless RTT ranging with the single wireless device comprising performing wireless RTT ranging with the single wireless device using only one of the multiple source addresses.

A computing device comprising: a processor; and a computer-readable storage medium having stored thereon multiple instructions that implement an energy conserving round trip time (RTT) ranging system and that, responsive to execution by the processor, cause the processor to perform acts including: determining that a single wireless device is using multiple source addresses to communicate management frames; selecting one of the multiple source addresses; and performing wireless RTT ranging with the single wireless device using the selected one of the multiple source addresses but fewer than all of the multiple source addresses, the performing wireless RTT ranging with the single device including communicating multiple frames to the wireless device and receiving multiple frames from the wireless device.

Alternatively or in addition to the above described computing device, any one or combination of the following. Receiving a source address list from an application on the computing device, the source address list identifying multiple source addresses with which the application desires the computing device to be RTT ranged; identifying two or more source addresses on the source address list that are used by the single wireless device; and generating a source address set identifying multiple sources addresses with which the computing device is to be RTT ranged, the generating comprising including only one of the two or more source addresses in the source address set. The determining comprising: receiving a fast initial link setup (FILS) beacon from the single wireless device; and determining, from a basic service set identifier (BSSID) field in the FILS beacon, the multiple source addresses used by the single wireless device. The determining comprising determining, based on management frames received from the single wireless device, that the single wireless device is a multi-band wireless device transmitting management frames using different BSSIDs for different ones of multiple frequency bands. The performing wireless RTT ranging with the single wireless device comprising performing wireless RTT ranging without connecting to the single wireless device.

An energy conserving round trip time (RTT) ranging system comprising: a first module, implemented at least in part in hardware, configured to determine that a single wireless device is using multiple source addresses to communicate management frames, and further configured to select one of the multiple source addresses; and a second module, implemented at least in part in hardware, configured to perform wireless RTT ranging with the single wireless device using the selected one of the multiple source addresses but fewer than all of the multiple source addresses, the performing wireless RTT ranging with the single device including communicating multiple frames to the wireless device and receiving multiple frames from the wireless device.

Alternatively or in addition to the above described system, any one or combination of the following. Wherein the first module is further configured to: receive a source address list from an application, the source address list identifying multiple source addresses with which the application desires wireless RTT ranging; identify two or more source addresses on the source address list that are used by the single wireless device; and generate a source address set identifying multiple sources addresses with which wireless RTT ranging is to be performed, the generating comprising including only one of the two or more source addresses in the source address set. Wherein the first module is further configured to receive a fast initial link setup (FILS) beacon from the single wireless device and determine, from a basic service set identifier (BSSID) field in the FILS beacon, the multiple source addresses used by the single wireless device. Wherein the first module is further configured to determine, based on management frames received from the single wireless device, that the single wireless device is a multi-band wireless device transmitting management frames using different BSSIDs for different ones of multiple frequency bands. Wherein the first module is further configured to determine that a single wireless device is using multiple source addresses to communicate management frames by determining, based on management frames received from the single wireless device, that the single wireless device is using multiple locally administered source addresses. Wherein the first module is further configured to determine that a single wireless device is using multiple source addresses to communicate management frames by determining, based on management frames received from the single wireless device, that the single wireless device is using at least one locally administered source address and a universal administered source address.

The invention claimed is:

1. A method comprising:
   determining, in a computing device, that a single wireless device is using multiple source addresses to communicate management frames;
   selecting one of the multiple source addresses; and
   performing, by the computing device and without connecting to the single wireless device, wireless round trip time (RTT) ranging with the single wireless device using the selected one of the multiple source addresses but fewer than all of the multiple source addresses used by the single wireless device to communicate management frames, the performing wireless RTT ranging with the single wireless device including communicating multiple frames to the wireless device and receiving multiple frames from the wireless device.

2. The method as recited in claim 1, further comprising:
   receiving a source address list from an application on the computing device, the source address list identifying multiple source addresses with which the application desires the computing device to be RTT ranged;
   identifying two or more source addresses on the source address list that are used by the single wireless device; and
   generating a source address set identifying multiple source addresses with which the computing device is to be RTT ranged, the generating comprising including only one of the two or more source addresses in the source address set.

3. The method as recited in claim 1, the determining comprising:
   receiving a fast initial link setup (FILS) beacon from the single wireless device; and
   determining, from a basic service set identifier (BSSID) field in the FILS beacon, the multiple source addresses used by the single wireless device.

4. The method as recited in claim 3, further comprising:
   determining whether a multiple BSSID support field in the FILS beacon is set to indicate that the single wireless device supports multiple BSSIDs; and
   determining, in response to the multiple BSSID support field being set to indicate that the single wireless device supports multiple BSSIDs, the multiple source addresses used by the single wireless device.

5. The method as recited in claim 1, the determining comprising determining, based on management frames received from the single wireless device, that the single wireless device is a multi-band wireless device transmitting management frames using different BSSIDs for different ones of multiple frequency bands.

6. The method as recited in claim 1, the determining comprising determining that a single wireless device is using multiple source addresses to communicate management frames by determining, based on management frames received from the single wireless device, that the single wireless device is using multiple locally administered source addresses.

7. The method as recited in claim 1, the determining comprising determining that a single wireless device is using multiple source addresses to communicate management frames by determining, based on management frames received from the single wireless device, that the single wireless device is using at least one locally administered source address and a universal administered source address.

8. The method as recited in claim 1, the performing wireless RTT ranging with the single wireless device comprising performing wireless RTT ranging with the single wireless device using only one of the multiple source addresses.

9. A computing device comprising:
a processor; and
a computer-readable storage medium having stored thereon multiple instructions that implement an energy conserving round trip time (RTT) ranging system and that, responsive to execution by the processor, cause the processor to perform acts including:
receiving a source address list from an application on the computing device, the source address list identifying multiple source addresses with which the application desires the computing device to be RTT ranged;
identifying two or more source addresses on the source address list that are used by a single wireless device to communicate management frames;
generating a source address set identifying multiple sources addresses with which the computing device is to be RTT ranged, the generating comprising including only one of the two or more source addresses in the source address set; and
performing wireless RTT ranging with the single wireless device using the selected one of the two or more source addresses but fewer than all of the two or more source addresses, the performing wireless RTT ranging with the single wireless device including communicating multiple frames to the wireless device and receiving multiple frames from the wireless device.

10. The computing device as recited in claim 9, the acts further including:
receiving a fast initial link setup (FILS) beacon from an additional wireless device;
determining, from a basic service set identifier (BSSID) field in the FILS beacon, multiple source addresses used by the additional wireless device to communicate management frames;
selecting one of the multiple source addresses used by the additional wireless device; and
performing wireless RTT ranging with the additional wireless device using the selected one of the multiple source addresses used by the additional wireless device but fewer than all of the multiple source addresses used by the additional wireless device, the performing wireless RTT ranging with the additional wireless device including communicating multiple frames to the additional wireless device and receiving multiple frames from the additional wireless device.

11. The computing device as recited in claim 9, the acts further including determining, based on management frames received from an additional wireless device, that the additional wireless device is a multi-band wireless device transmitting management frames using different BSSIDs for different ones of multiple frequency bands;
selecting one of multiple source addresses used by the additional wireless device to communicate management frames; and
performing wireless RTT ranging with the additional wireless device using the selected one of the multiple source addresses used by the additional wireless device but fewer than all of the multiple source addresses used by the additional wireless device, the performing wireless RTT ranging with the additional wireless device including communicating multiple frames to the additional wireless device and receiving multiple frames from the additional wireless device.

12. The computing device as recited in claim 9, the performing wireless RTT ranging with the single wireless device comprising performing wireless RTT ranging without connecting to the single wireless device.

13. An energy conserving round trip time (RTT) ranging system comprising:
a first module, implemented at least in part in hardware, configured to determine that a single wireless device is using multiple source addresses to communicate management frames by determining, based on management frames received from the single wireless device, that the single wireless device is using at least one locally administered source address and a universal administered source address, and further configured to select one of the multiple source addresses; and
a second module, implemented at least in part in hardware, configured to perform wireless RTT ranging with the single wireless device using the selected one of the multiple source addresses but fewer than all of the multiple source addresses, the performing wireless RTT ranging with the single wireless device including communicating multiple frames to the wireless device and receiving multiple frames from the wireless device.

14. The system as recited in claim 13, wherein:
the first module is further configured to:
receive a source address list from an application, the source address list identifying multiple source addresses with which the application desires wireless RTT ranging,
identify two or more source addresses on the source address list that are used by an additional wireless device,
generate a source address set identifying multiple source addresses used by the additional wireless device with which wireless RTT ranging is to be performed, the generating comprising including only one of the two or more source addresses in the source address set, and
select one of the multiple source addresses in the source address list; and
the second module is further configured to:
perform wireless RTT ranging with the additional wireless device using the selected one of the multiple source addresses in the source address list but fewer than all of the multiple source addresses in the source address list, the performing wireless RTT ranging with the additional wireless device including communicating multiple frames to the additional wireless device and receiving multiple frames from the additional wireless device.

15. The system as recited in claim 13,
wherein the first module is further configured to receive a fast initial link setup (FILS) beacon from an additional wireless device, determine, from a basic service set identifier (BSSID) field in the FILS beacon, multiple source addresses used by the additional wireless device, and to select one of the multiple source addresses used by the additional wireless device; and
wherein the second module is further configured to perform wireless RTT ranging with the additional wireless device using the selected one of the multiple source addresses used by the additional wireless device but fewer than all of the multiple source addresses used by the additional wireless device, the performing wireless RTT ranging with the additional wireless device including communicating multiple frames to the additional wireless device and receiving multiple frames from the additional wireless device.

16. The system as recited in claim 13,
wherein the first module is further configured to determine, based on management frames received from an additional wireless device, that the additional wireless device is a multi-band wireless device transmitting management frames using different BSSIDs for different ones of multiple frequency bands, and to select one of multiple source addresses used by the additional wireless device; and
wherein the second module is further configured to perform wireless RTT ranging with the additional wireless device using the selected one of the multiple source addresses used by the additional wireless device but fewer than all of the multiple source addresses used by the additional wireless device, the performing wireless RTT ranging with the additional wireless device including communicating multiple frames to the additional wireless device and receiving multiple frames from the additional wireless device.

17. The system as recited in claim 13,
wherein the first module is further configured to determine that an additional wireless device is using multiple source addresses to communicate management frames by determining, based on management frames received from the additional wireless device, that the additional wireless device is using multiple locally administered source addresses, and to select one of multiple source addresses used by the additional wireless device; and
wherein the second module is further configured to perform wireless RTT ranging with the additional wireless device using the selected one of the multiple source addresses used by the additional wireless device but fewer than all of the multiple source addresses used by the additional wireless device, the performing wireless RTT ranging with the additional wireless device including communicating multiple frames to the additional wireless device and receiving multiple frames from the additional wireless device.

18. A method comprising:
receiving a fast initial link setup (FILS) beacon from a single wireless device;
determining whether a multiple basic service set identifier (BSSID) support field in the FILS beacon is set to indicate that the single wireless device supports multiple BSSIDs;
determining, from a BSSID field in the FILS beacon in response to the multiple BSSID support field being set to indicate that the single wireless device supports multiple BSSIDs, multiple source addresses used by the single wireless device;
selecting one of the multiple source addresses; and
performing, by the computing device, wireless round trip time (RTT) ranging with the single wireless device using the selected one of the multiple source addresses but fewer than all of the multiple source addresses used by the single wireless device to communicate management frames, the performing wireless RTT ranging with the single wireless device including communicating multiple frames to the wireless device and receiving multiple frames from the wireless device.

19. The method as recited in claim 18, the performing wireless RTT ranging with the single wireless device comprising performing wireless RTT ranging with the single wireless device using only the selected one of the multiple source addresses.

20. The method as recited in claim 18, further comprising:
determining that an additional wireless device is using multiple source addresses to communicate management frames by determining, based on management frames received from the additional wireless device, that the additional wireless device is using at least one locally administered source address and a universal administered source address;
selecting one of the multiple source addresses used by the additional wireless device; and
performing, by the computing device, wireless RTT ranging with the additional wireless device using the selected one of the multiple source addresses used by the additional wireless device but fewer than all of the multiple source addresses used by the additional wireless device to communicate management frames, the performing wireless RTT ranging with the additional wireless device including communicating multiple frames to the additional wireless device and receiving multiple frames from the additional wireless device.

* * * * *